United States Patent
Kotov et al.

(10) Patent No.: US 9,694,518 B2
(45) Date of Patent: Jul. 4, 2017

(54) BREATH-ACTIVATED IMAGES AND ANTI-COUNTERFEIT AUTHENTICATION FEATURES FORMED OF NANOPILLAR ARRAYS

(71) Applicant: The Regents of the University of Michigan, Ann Arbor, MI (US)

(72) Inventors: Nicholas A. Kotov, Ypsilanti, MI (US); Kyoung G. Lee, Ann Arbor, MI (US); Terry Shyu, Ann Arbor, MI (US); Byeong Il Kim, Ann Arbor, MI (US); Bong Gill Choi, Ann Arbor, MI (US); Seok Jae Lee, Yuseong-gu (KR)

(73) Assignee: The Regents Of The University of Michigan, Ann Arbor, MI (US)

( * ) Notice: Subject to any disclaimer, the term of this patent is extended or adjusted under 35 U.S.C. 154(b) by 0 days.

(21) Appl. No.: 14/746,257

(22) Filed: Jun. 22, 2015

(65) Prior Publication Data
US 2015/0367380 A1    Dec. 24, 2015

Related U.S. Application Data

(60) Provisional application No. 62/014,918, filed on Jun. 20, 2014.

(51) Int. Cl.
*G06K 9/74* (2006.01)
*B29C 41/08* (2006.01)
(Continued)

(52) U.S. Cl.
CPC .......... *B29C 41/08* (2013.01); *B29C 37/0053* (2013.01); *B29C 41/20* (2013.01);
(Continued)

(58) Field of Classification Search
CPC .. B05D 1/02; B05D 1/36; B29C 35/02; B29C 41/08; B29C 41/20; G09F 3/0294
(Continued)

(56) References Cited

U.S. PATENT DOCUMENTS 4,908,278 A * 3/1990 Bland .................. B32B 7/02
                                                         264/145
5,518,767 A    5/1996 Rubner et al.
(Continued)

FOREIGN PATENT DOCUMENTS

EP          1285024 A1    2/2003
WO    WO-9607487 A1    3/1996
(Continued)

OTHER PUBLICATIONS

The Engineering Toolbox, https://web.archive.org/web/20070607233410/http://www.engineeringtoolbox.com/young-modulus-d_417.html.*
(Continued)

*Primary Examiner* — Hina F Ayub
(74) *Attorney, Agent, or Firm* — Harness, Dickey & Pierce, P.L.C.

(57) ABSTRACT

Disclosed are articles having authentication features, as well as methods for authenticating such articles by forming authentication features to prevent or diminish counterfeiting activities. A surface of an article to be authenticated (or a surface of a component associated with the article) may have a region with a periodic array of nanopillars comprising a polymeric material formed thereon. The array of nanopillars thus defines an authentication feature (e.g., a graphic image or other pattern). In certain aspects, the authentication feature may be substantially invisible to the human eye under normal conditions, but revealed when condensate is created on the surface by exposure to moisture or vapor
(Continued)

Figure 1:
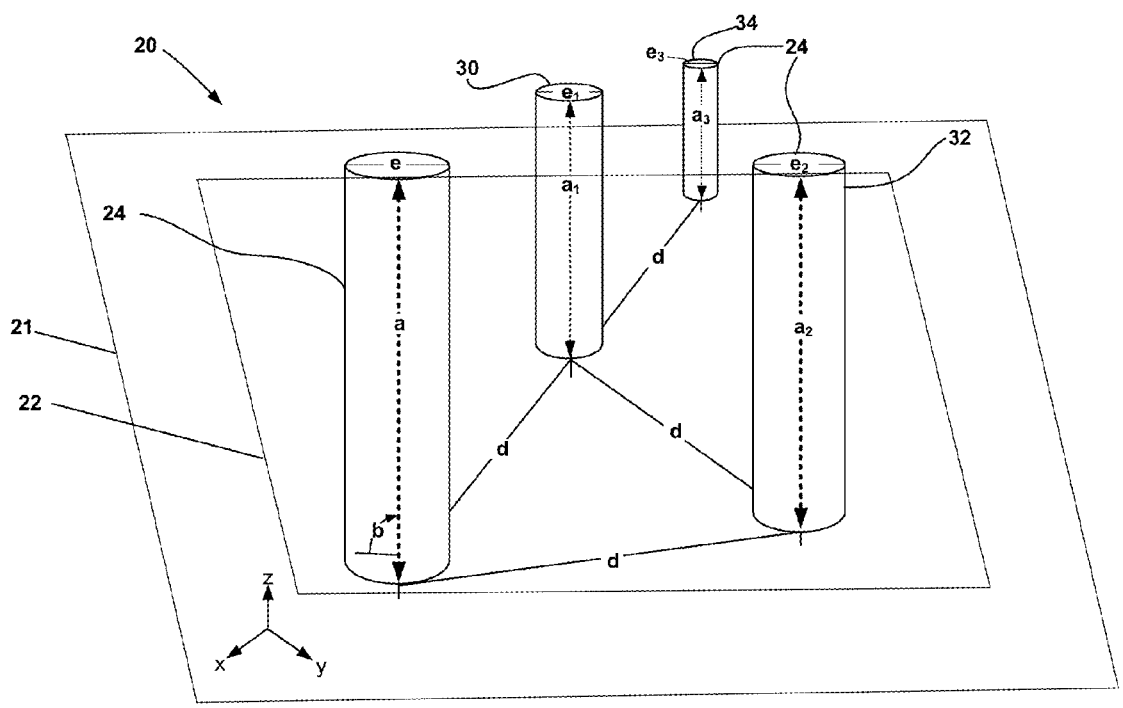

(e.g., human breath). The methods of forming nanopillar arrays disclosed herein are simple and permit single-step replication with high fidelity. Furthermore, the methods may be used with a variety of substrates, including fabric, textiles, leather, glass, paper, and metals by way of non-limiting example.

18 Claims, 15 Drawing Sheets

(51) Int. Cl.
| | |
|---|---|
| B29C 41/20 | (2006.01) |
| B42D 25/45 | (2014.01) |
| B42D 25/00 | (2014.01) |
| B29C 37/00 | (2006.01) |
| B29L 31/00 | (2006.01) |
| B29C 35/08 | (2006.01) |
| B29C 59/02 | (2006.01) |

(52) U.S. Cl.
CPC ............ *B42D 25/00* (2014.10); *B42D 25/45* (2014.10); *B29C 2035/0827* (2013.01); *B29C 2035/0833* (2013.01); *B29C 2059/023* (2013.01); *B29L 2031/744* (2013.01); *Y10T 428/2481* (2015.01); *Y10T 428/24893* (2015.01)

(58) Field of Classification Search
USPC .......................................................... 356/71
See application file for complete search history.

(56) References Cited

U.S. PATENT DOCUMENTS

| | | | | |
|---|---|---|---|---|
| 6,252,767 B1* | 6/2001 | Carlson | ................ | G06F 1/1616 292/148 |
| 6,881,444 B2 | 4/2005 | Hong et al. | | |
| 6,887,644 B1* | 5/2005 | Nozaki | ................ | G03F 7/0392 430/270.1 |
| 6,919,392 B1* | 7/2005 | Chenard | ................ | C08K 5/37 106/287.19 |
| 7,045,087 B2 | 5/2006 | Kotov | | |
| 7,223,327 B2 | 5/2007 | Schlenoff et al. | | |
| 7,438,953 B2 | 10/2008 | Kotov et al. | | |
| 8,795,783 B2 | 8/2014 | Kotov | | |
| 9,056,951 B2 | 6/2015 | Kotov et al. | | |
| 2001/0046564 A1 | 11/2001 | Kotov | | |
| 2002/0168520 A1* | 11/2002 | Toler | ................ | C03C 25/106 428/375 |
| 2003/0157325 A1 | 8/2003 | Anders et al. | | |
| 2004/0077513 A1* | 4/2004 | Lefenfeld | ................ | A61L 9/05 510/191 |
| 2004/0206942 A1 | 10/2004 | Hsu | | |
| 2005/0008674 A1 | 1/2005 | Wagner et al. | | |
| 2006/0270770 A1* | 11/2006 | Feng | ................ | C08K 5/54 524/268 |
| 2008/0286880 A1* | 11/2008 | Al-Murrani | ................ | B82Y 15/00 436/166 |
| 2010/0080954 A1 | 4/2010 | Mohseni | | |
| 2010/0130646 A1* | 5/2010 | Park | ................ | C08G 59/5033 523/440 |
| 2010/0195916 A1* | 8/2010 | Blondiaux | ................ | G06K 19/086 382/209 |
| 2010/0219626 A1* | 9/2010 | Dietemann | ................ | B41M 3/144 283/92 |
| 2011/0040111 A1* | 2/2011 | Ono | ................ | C07D 303/36 549/514 |
| 2011/0128536 A1* | 6/2011 | Bond | ................ | B82Y 20/00 356/301 |
| 2011/0250427 A1 | 10/2011 | Kotov et al. | | |
| 2012/0003441 A1* | 1/2012 | Chen | ................ | B32B 27/08 428/206 |
| 2012/0092660 A1* | 4/2012 | Wu | ................ | G01N 21/658 356/301 |
| 2012/0156389 A1 | 6/2012 | Kotov | | |
| 2012/0256886 A1* | 10/2012 | Ryu | ................ | G06F 1/1632 345/204 |
| 2013/0035753 A1* | 2/2013 | Chen | ................ | B05B 13/0442 623/1.16 |
| 2014/0256840 A1* | 9/2014 | Chow | ................ | H01B 1/04 522/114 |
| 2015/0173656 A1* | 6/2015 | Barcelo | ................ | A61B 5/1459 600/341 |

FOREIGN PATENT DOCUMENTS

| | | |
|---|---|---|
| WO | WO-0044507 A1 | 8/2000 |
| WO | WO-01/72878 A1 | 10/2001 |
| WO | WO-03/001575 A2 | 1/2003 |
| WO | WO-2009/062146 A2 | 5/2009 |
| WO | WO-2009/085362 A2 | 7/2009 |
| WO | WO-2011/026104 A2 | 3/2011 |

OTHER PUBLICATIONS

The Engineering Toolbox, http://www.engineeringtoolbox.com/young-modulus-d_417.html, Feb. 9, 2014.*
Vahid Mirjalili et al. "Modelling of the carbon nanotube bridging effect on the toughening of polymers and experimental verification", Composites Science and Technology 70 (2010), pp. 1537-1543.*
Rosidian, Aprillya et al., "Ionic Self-Assembly of Ultrahard $ZrO_2$/Polymer Nanocomposite Thin Films," Advanced Materials, vol. 10, No. 14, pp. 1087-1091, 1998.

* cited by examiner

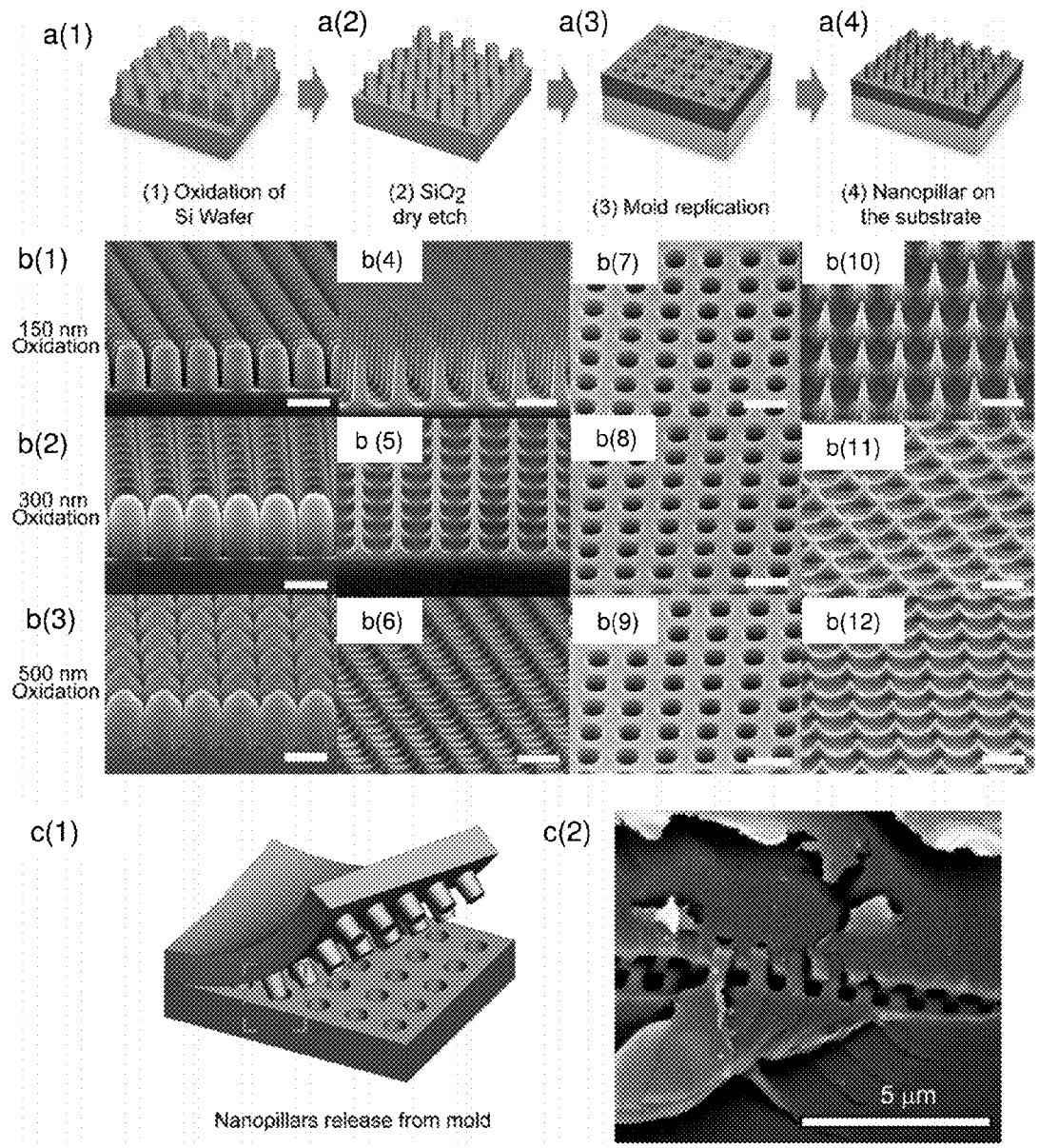
FIGS. 4(A)(1)-4(C)(2)

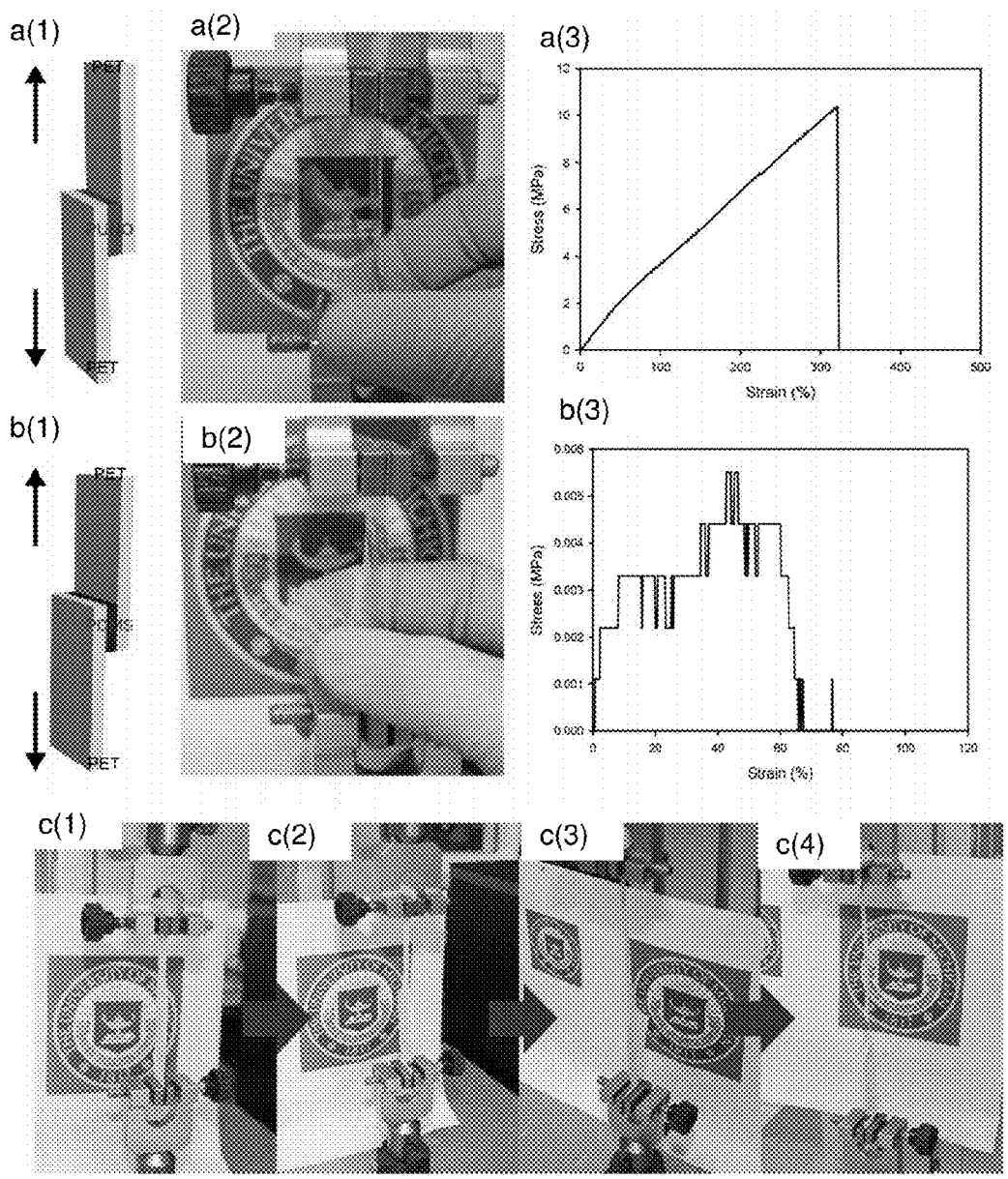
FIGS. 7(A)(1)-7(C)(4)

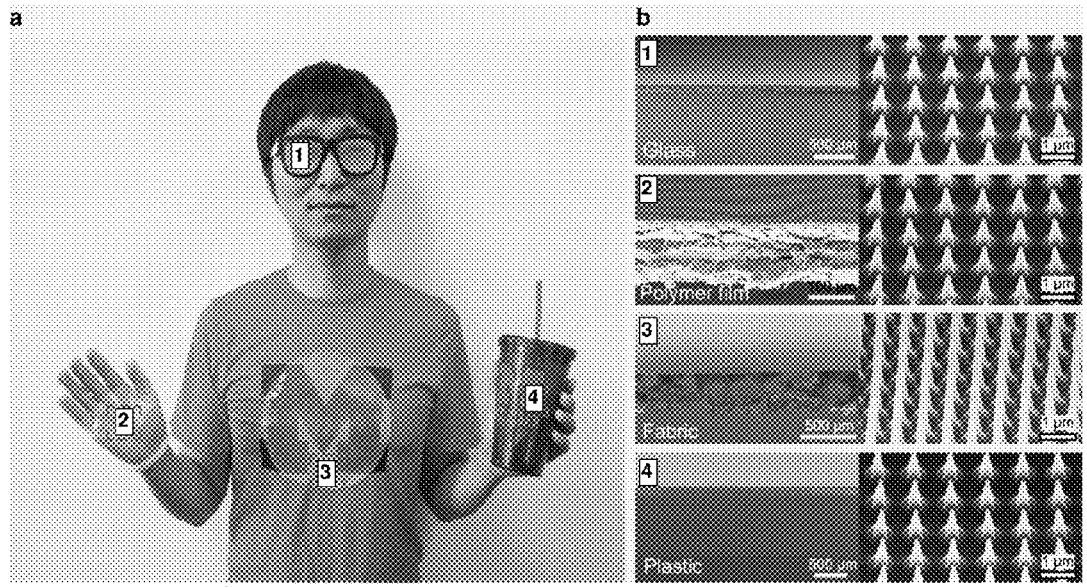
FIGS. 9(A)-9(B)(4)
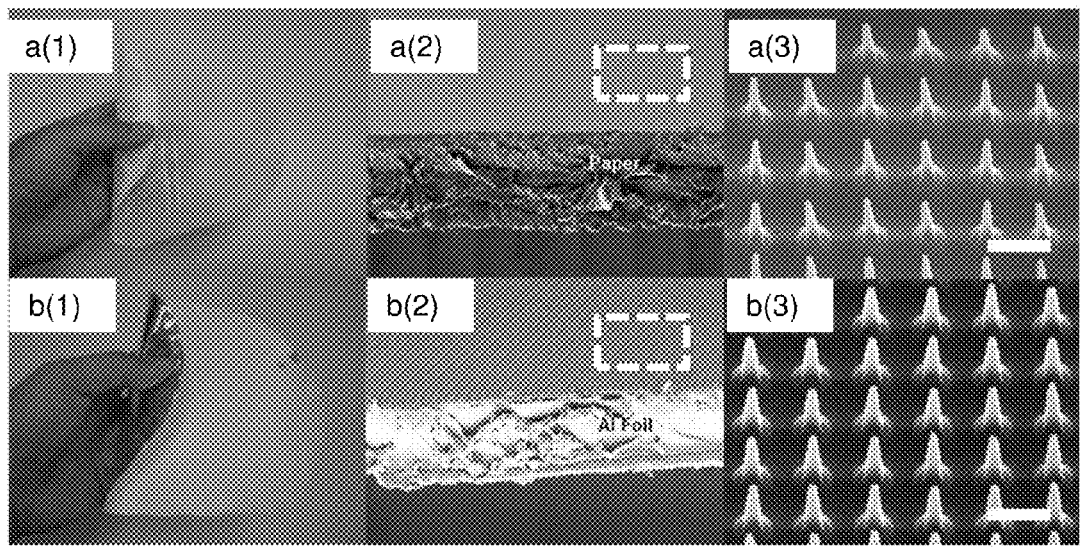
FIGS. 10(A)(1)-10(B)(3)

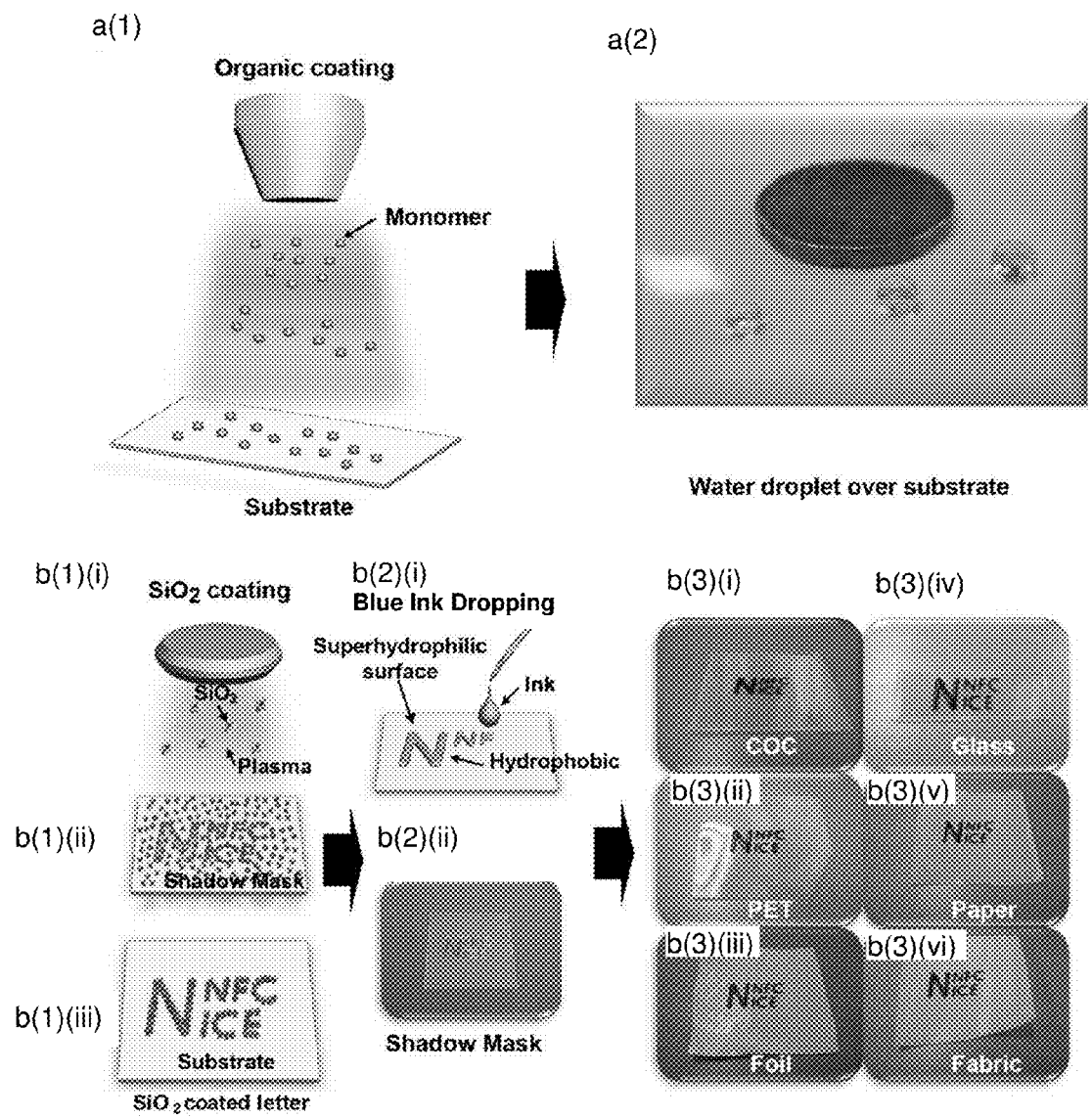
FIGS. 11(A)(1)-11(B)(3)(VI)

BREATH-ACTIVATED IMAGES AND ANTI-COUNTERFEIT AUTHENTICATION FEATURES FORMED OF NANOPILLAR ARRAYS

CROSS-REFERENCE TO RELATED APPLICATIONS

This application claims the benefit of U.S. Provisional Application No. 62/014,918 filed on Jun. 20, 2014. The entire disclosure of the above application is incorporated herein by reference.

GOVERNMENT RIGHTS

This invention is made with government support under CBET1138757 and CBET0932823 awarded by the National Science Foundation. The Government has certain rights in the invention.

FIELD

The present disclosure relates to breath-activated images and anti-counterfeit tags on nanopillars.

BACKGROUND

This section provides background information related to the present disclosure which is not necessarily prior art.

Counterfeit activity is rampant for various consumer and industrial goods, including in pharmaceuticals and medicine, electronics, food, auto parts, currency, books, stocks and bonds, software, DVDs, CDs, video games, textiles, clothing, handbags, and leather goods, by way of non-limiting example. Counterfeit and pirated consumer goods are estimated to make up 2 to 7% of world trade each year. Multiple estimates place the revenue of this illicit market between $200 and $600 billion dollars per year. As noted above, a wide variety of industries have been impacted by sales of such counterfeit goods, including pharmaceuticals, fashion, electronics, automotive, military and defense, among others.

It is not uncommon for counterfeit or otherwise unauthorized goods to be manufactured, distributed, and sold in direct competition with authentic goods. When such counterfeit goods are sold on the black market, these counterfeit sales deprive businesses and industries of lost sales of authentic goods. Further, poor quality counterfeit products pose potential consumer health and safety risks, and thus potential product liability and quality issues. For example, diminished quality may result in harm or loss of brand goodwill due to consumers associating and confusing authentic goods with poor quality imitation counterfeit products that flood the market. Further, money from such counterfeit sales has been associated with funding of illegal and criminal enterprises, including funding of terrorism and organized crime. Thus, the illegal commercial activities associated with sales of counterfeit items presents a host of other issues, exemplified by international commercial conflicts, environmental issues, public health/safety issues, and national security threats. An ability to authenticate items for counterfeit deterrence is important in many industries.

Anti-counterfeiting measures are used on many different products and in many different markets, ranging from pharmaceutical goods to high fashion items. Currently available anti-counterfeit solutions include barcodes, specialized inks, holograms, vivid logos, radio frequency identification (RFID) tags, near field communication (NFC), and microchips. Generally these efforts can be categorized as visible (readily visible with the human eye) or covert (requiring a specialized detection device or reader). Each of these authentication tools has advantages and disadvantages. Some of them are relatively cheap and therefore widely used, such as holograms. However, many of these existing anti-counterfeit measures rely on technologies that are becoming increasingly easy to duplicate (for example, holograms and specialized inks). The covert tags are somewhat harder to replicate, but the counterfeit goods are not easily detected by the unsuspecting end consumer. Further, devices that require special detection methods are themselves susceptible to hacking by third parties. Some retailers, packaging companies, and shipping services do not place any tags at all because of the cost, complexity of authentication, and undesirable visual appearance of tags. Thus, there is a need for high-tech anti-counterfeit tags that are simple and difficult to create, yet are easily and safely read by the supply chain and end consumer for verification of authenticity and counterfeit deterrence.

SUMMARY

This section provides a general summary of the disclosure, and is not a comprehensive disclosure of its full scope or all of its features.

In various aspects, the present disclosure provides new methods for authenticating articles to prevent or diminish counterfeiting activities. In certain aspects, the present disclosure provides an article having an authentication feature that comprises a surface and an array of nanopillars disposed on a region of the surface. The nanopillars comprise a polymeric material. In certain aspects, the polymeric material may have (i) a Young's modulus of greater than or equal to about 10 MPa, (ii) an ultimate tensile strength ($\sigma_{ult}$) of greater than or equal to about 2.4 MPa, or both (i) and (ii). In this manner, the array of nanopillars thus defines the authentication feature.

In other aspects, the present disclosure contemplates a method of making an article having an authentication feature. Such a method may comprise applying a polymeric precursor to a mold comprising an array of nanoholes, so that the polymeric precursor fills the nanoholes. Then, a surface of the article to be authenticated (e.g., to bear the authentication feature) is disposed against the mold in contact with the polymeric precursor. The polymeric precursor is at least partially cured to form a polymeric material. The at least partial curing may occur either before or after the disposing of the surface against the mold. The article may then be removed or released from contact with the mold, so that the surface of the article comprises an array of nanopillars disposed thereon that define the authentication feature.

In yet other aspects, the present disclosure provides an article having an authentication feature. The authentication feature comprises a surface of the article and an array of nanopillars comprising a polymeric material disposed on a region of the surface. The polymeric material may be selected from the group consisting of: polyurethane acrylate, epoxy, a urethane-based mercapto ester polymer, and combinations thereof. The array of nanopillars thus defines the authentication feature.

In certain aspects, the present disclosure further contemplates methods of authenticating an article having an authentication feature. For example, such a method may comprise applying moisture or vapor to a region of a surface of the article having an array of polymeric nanopillars that is substantially invisible to a human eye in the absence of condensate. When applied, for example, via breathing on the surface, the moisture or vapor condenses on the region of the surface to reveal a graphic image that is observed by the human eye serving to authenticate the article.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
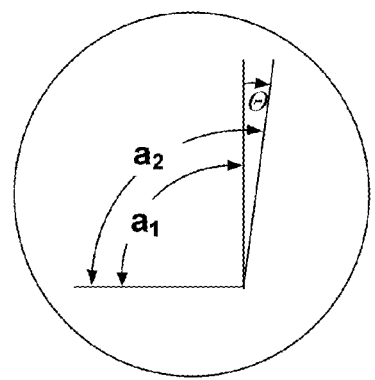
Figures 3A, 3P:
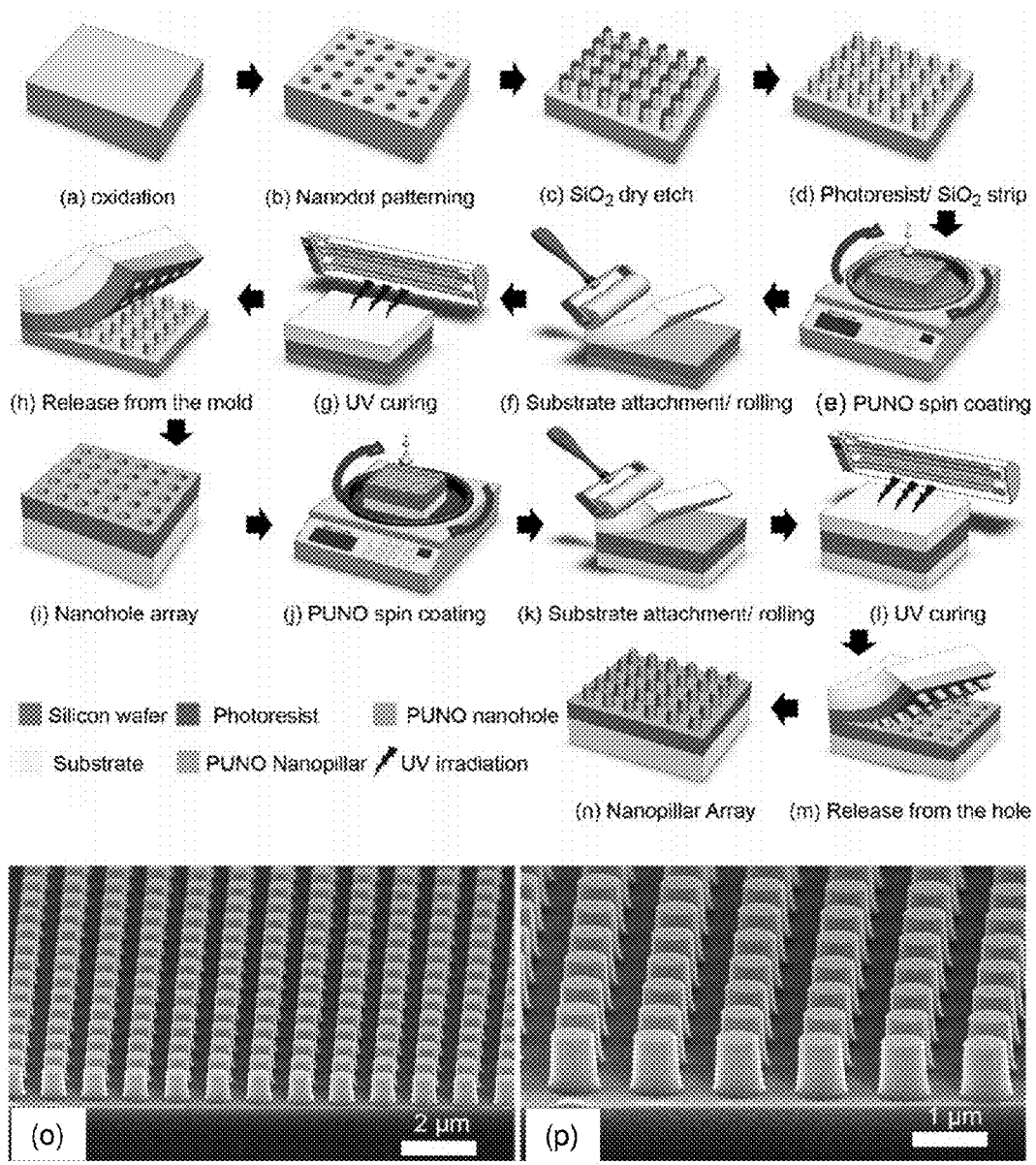
Figures 5A, 5B, 5C, 5D, 5E:
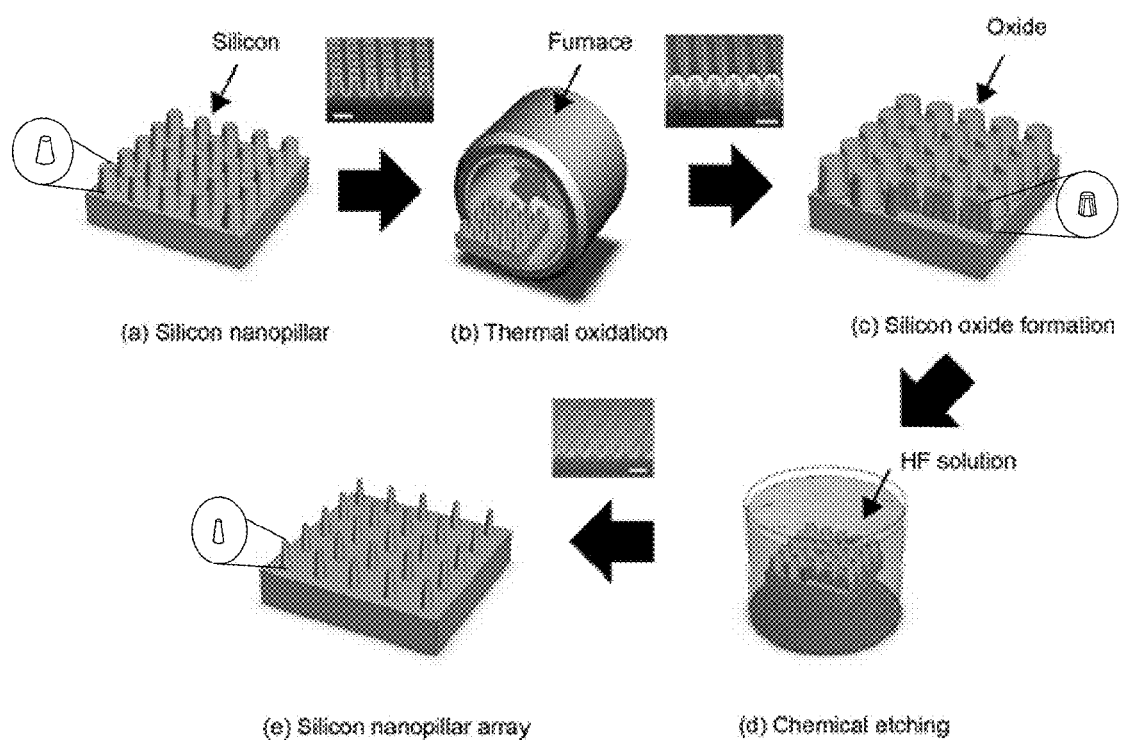

FIG. 1 schematically shows an exemplary variation of a nanopillar array comprising a plurality of nanopillars used as an authentication feature on a surface of an object or article in accordance with certain the principles of the present disclosure;

FIG. 2 shows angles formed between a first nanopillar and a second distinct nanopillar of the nanopillar array shown in FIG. 1;

FIGS. 3(a)-3(p). FIGS. 3(a)-3(n) show detailed schematic illustrations of steps for one exemplary method of fabricating a polymeric nanopillar array for use as an authentication feature in accordance with certain aspects of the present disclosure. FIGS. 3(o)-3(p) show SEM images of an original nanopillar mold formed of silicon/silicon oxide.

FIGS. 4(a)(1)-4(c)(2). FIGS. 4(a)(1)-4(a)(4) show a schematic layout of master template formation and double replication to construct nanopillars on a target substrate of an article in accordance with certain aspects of the present disclosure. FIGS. 4(b)(1)-4(b)(12) show SEM images of different Si oxidation states (leftmost) and etching of $SiO_2$ to control the final dimensions of nanopillar (rightmost). All the scale bars are 1 μm. FIG. 4(c)(1) is a schematic illustration of nanopillar release from a mold and FIG. 4(c)(2) is an SEM image of a cross-section between nanopillars and a mold displaying spontaneous detachment of the nanopillars from the mold walls after curing in accordance with certain aspects of the present disclosure.

FIGS. 5(a)-5(e) show a schematic illustration of an exemplary fabrication process of silicon nanopillar arrays for use as an authentication feature on a silicon wafer, in accordance with certain aspects of the present disclosure. The amount of oxygen doping in the silicon wafer converts Si into $SiO_2$ and determines the final dimension of Si nanopillar arrays. The oxide formation can be calculated using the Deal-Grove model.

Figure 6:
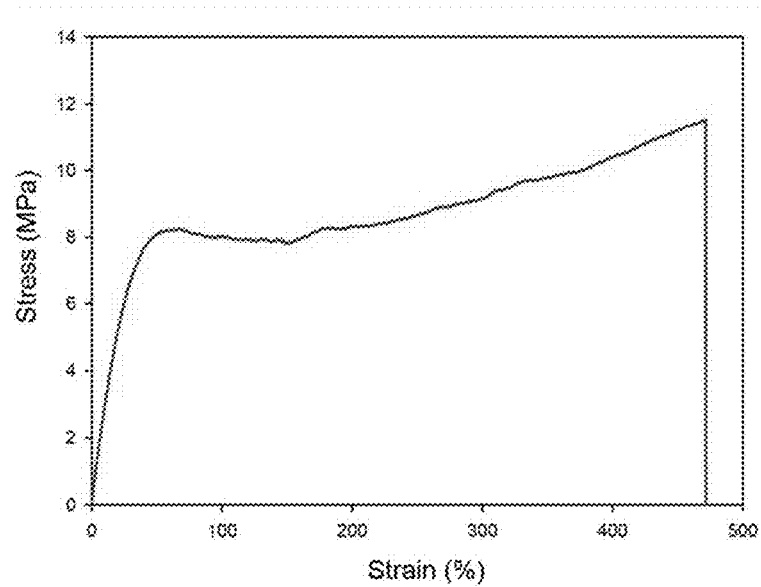

FIG. 6 shows a stress—strain curve for a thin polymeric film formed of a blend of polyurethane acrylate and a urethane-based mercapto ester polymer (Norland Optical Adhesive NOA 63 commercially available from Norland Products, Inc.) referred to as "PUNO."

FIGS. 7(a)(1)-7(c)(4). FIGS. 7(a)(1)-7(c)(4) shows adhesion tests for systems having different substrates including a polyethylene terephthalate (PET)/PUNO/PET system (FIGS. 7(a)(1)-7(a)(3)), a PET/PDMS/PET system (FIGS. 7(b)(1)-7(b)(3)), and a fabric/PUNO/fabric system (FIGS. 7(c)(1)-7(c)(4)). Schematics and photographic images of the samples used in testing of adhesive characteristics of PUNO (FIGS. 7(a)(1)-7(a)(3)) and PDMS (FIGS. 7(b)(1)-7(b)(3)) placed between PET films under tensile force are shown. FIGS. 7(c)(1)-7(c)(4) are photographic images of Fabric/PUNO/fabric sample being stretched to failure.

Figures 8A, 8B, 8C, 8D:
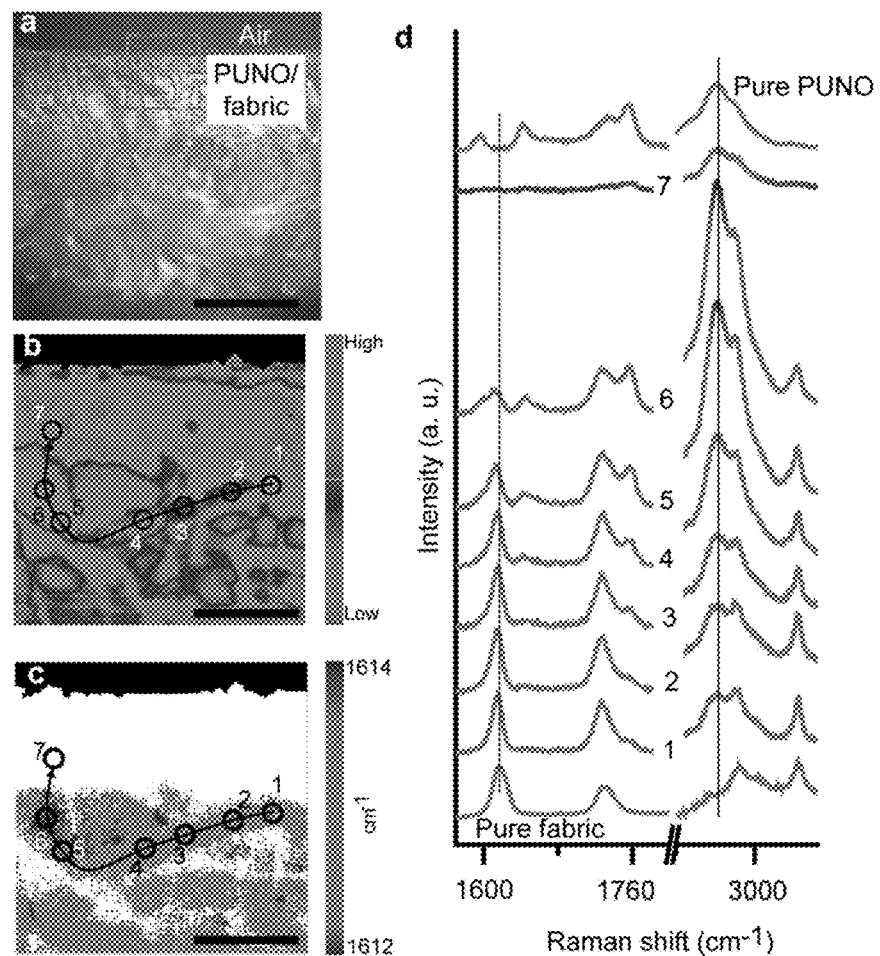

FIGS. 8(a)-8(d) show Raman spectroscopy imaging of interface between PUNO and fabric. FIG. 8(a) shows optical microscopy image of cross-sectional PUNO/fabric composite film. FIG. 8(b) shows Raman maps for the peak intensity at around 2928 $cm^{-1}$ attributed to the $v_{C-H}$ stretch of PUNO and FIG. 8(c) shows the peak frequency shift at around 1617 $cm^{-1}$ attributed to the $v_{C=C}$ stretch of aromatic ring of fabric according to the red rectangular of FIG. 8(a). FIG. 8(d) shows Raman spectra of neat PUNO, fabric, and PUNO/fabric interface along with direction numbers in FIGS. 8(b)-8(c). All the scale bars in FIGS. 8(a)-8(c) are 50 μm.

FIGS. 9(a)-9(b)(4). FIG. 9(a) shows a photograph of nanopillar arrays formed in accordance with certain aspects of the present disclosure for use as authentication features on diverse substrates, including glasses, plastic cup, T-shirt, and a polymeric glove. FIGS. 9(b)(1)-9(b)(4) show SEM images of cross-sections of boundary and surface of nanopillar arrays on the corresponding materials in image FIG. 9(a).

FIGS. 10(a)(1)-10(b)(3) show photographic and SEM images of nanopillar arrays for use as authentication features formed in accordance with certain aspects of the present disclosure on a paper substrate in FIGS. 10(a)(1)-10(a)(3) and on aluminum (Al) foil in FIGS. 10(b)(1)-10(b)(3), respectively. FIG. 10(a)(3) is a detailed image of the select area of the paper substrate having an array of nanopillars in FIG. 10(a)(2), while FIG. 10(b)(3) is a detailed image of the select area of the aluminum foil substrate having an array of nanopillars in FIG. 10(b)(2). Scale bars are 1 μm.

FIGS. 11(a)(1)-11(b)(3)(vi) show schematic illustrations of both superhydrophobic and superhydrophilic coating processes to change surface contact angles (CAs) in accordance with certain aspects of the present disclosure. FIGS. 11(a)(1)-11(a)(2) show surface conversion of a nanopillar array into a hydrophobic/superhydrophobic state. FIGS. 11(b)(1)(i)-11(b)(3)(iii) show a localized superhydrophilic coating formed over nanopillar arrays by use of a shadow mask to induce water ink pattern formation. More specifically, FIGS. 11(b)(1)(i)-11(b)(I)(iii) show steps of applying an $SiO_2$ coating via plasma deposition (FIG. 11(b)(1)(i)) onto a substrate having a nanopillar array formed thereon and a shadow mask with a design (of letters) disposed over the nanopillar array (FIG. 11(b)(1)(ii)). After deposition of the $SiO_2$ coating, the shadow mask is removed and the masked design region (letters) have the $SiO_2$ coating applied defining hydrophilic or superhydrophilic regions, as shown in FIG. 11(b)(1)(iii). FIG. 11(b)(i) shows application of blue ink to the coated surface (hydrophobic) having a design pattern formed therein (hydrophilic or super hydrophilic regions coated with $SiO_2$), so that the ink fills the hydrophilic or superhydrophilic regions. FIG. 11(b)(ii) shows a shadow mask having opening corresponding to the design to be applied to the surface. FIGS. 11(b)(3)(i)-11(b)(3)(vi) show photographs of a variety of substrates treated by such a process, including cyclic olefin copolymer (COC) (FIG. 11(b)(3)(i)), glass (FIG. 11(b)(3)(iv)), polyethylene terephthalate (PET) (FIG. 11(b)(3)(ii)), paper (FIG. 11(b)(3)(v)), foil (FIG. 11(b)(3)(iii)), and fabric (FIG. 11(b)(3)(vi)).

Figures 12A, 12B, 12C, 12D:
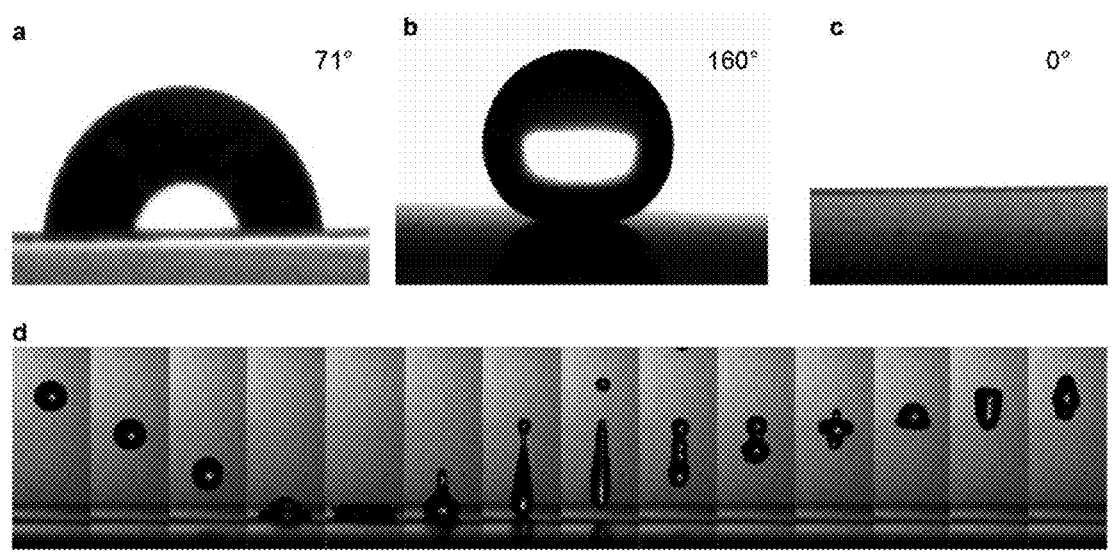

FIGS. 12(a)-12(d) show photographic images of a water droplet over various surfaces. FIG. 12(a) shows water on pristine PUNO nanopillar arrays for use as an authentication feature formed in accordance with certain aspects of the present disclosure. FIG. 12(b) shows a superhydrophobic surface on the nanopillar array formed in accordance with certain aspects of the present disclosure. FIG. 12(c) shows a superhydrophilic coating on a nanopillar array formed in accordance with certain aspects of the present disclosure.

FIG. 12(*d*) shows snapshots from a high-speed camera of a corresponding water droplet bouncing over a superhydrophobic surface, like that in FIG. 12(*b*).

Figures 13A, 13B, 13C, 13D, 13E, 13F:
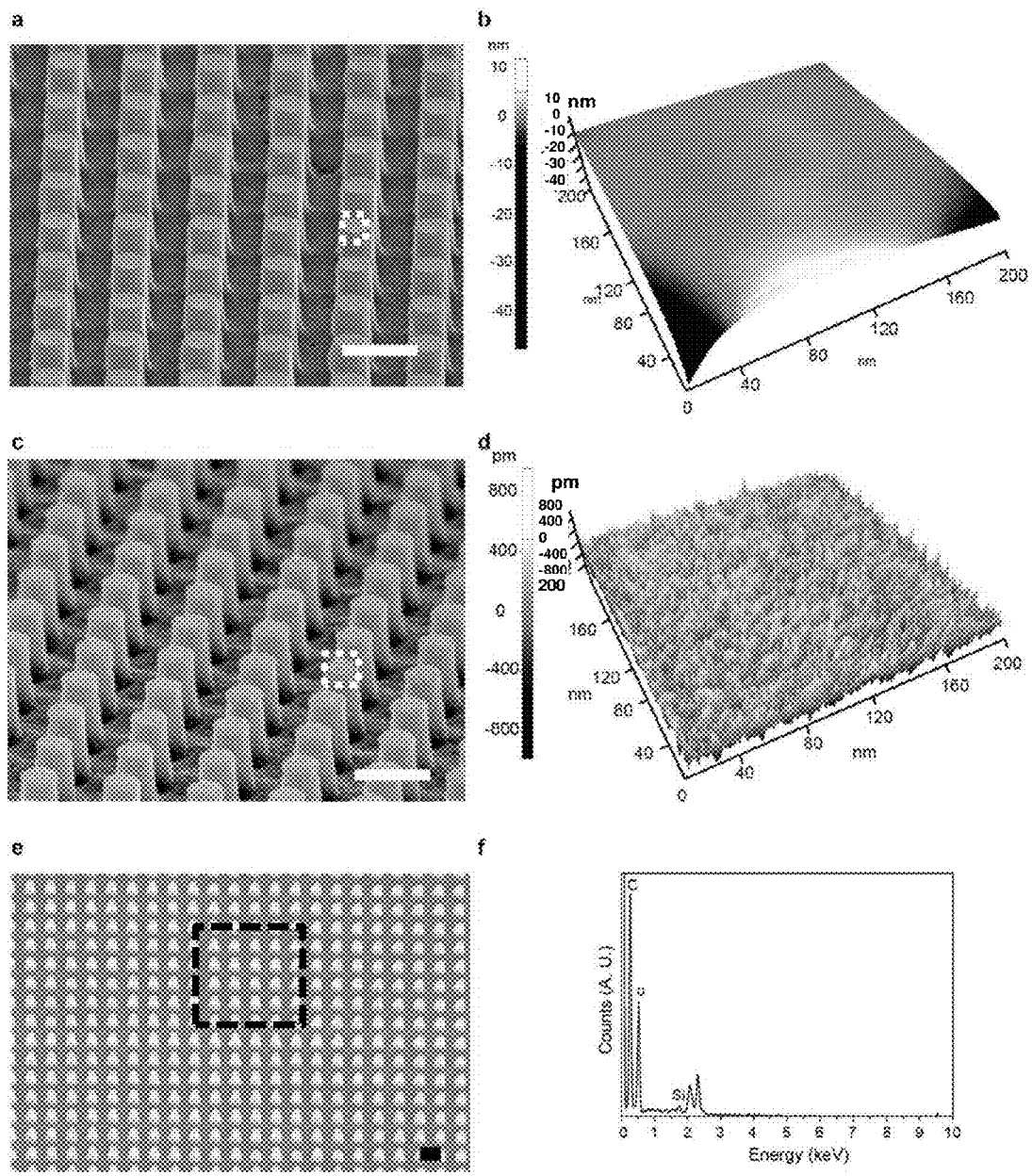

FIGS. 13(*a*)-13(*f*) show a change in surface roughness of an oxide coating over PUNO surface. SEM and AFM roughness images of polymeric nanopillars are shown before SiO$_2$ coating (FIGS. 13(*a*)-13(*b*)) and after SiO$_2$ coating (FIGS. 13(*c*)-13(*d*)). FIG. 13(*b*) is an AFM taken on the select region shown in FIG. 13(*a*), while FIG. 13(*d*) is from the select region shown in FIG. 13(*c*). SEM images of SiO$_2$-coated nanopillars arrays are shown in FIG. 13(*e*) and its energy dispersive X-ray spectra is shown in FIG. 13(*f*). Scale bars of SEM images are 1 µm.

Figures 14A, 14B, 14C, 14D:
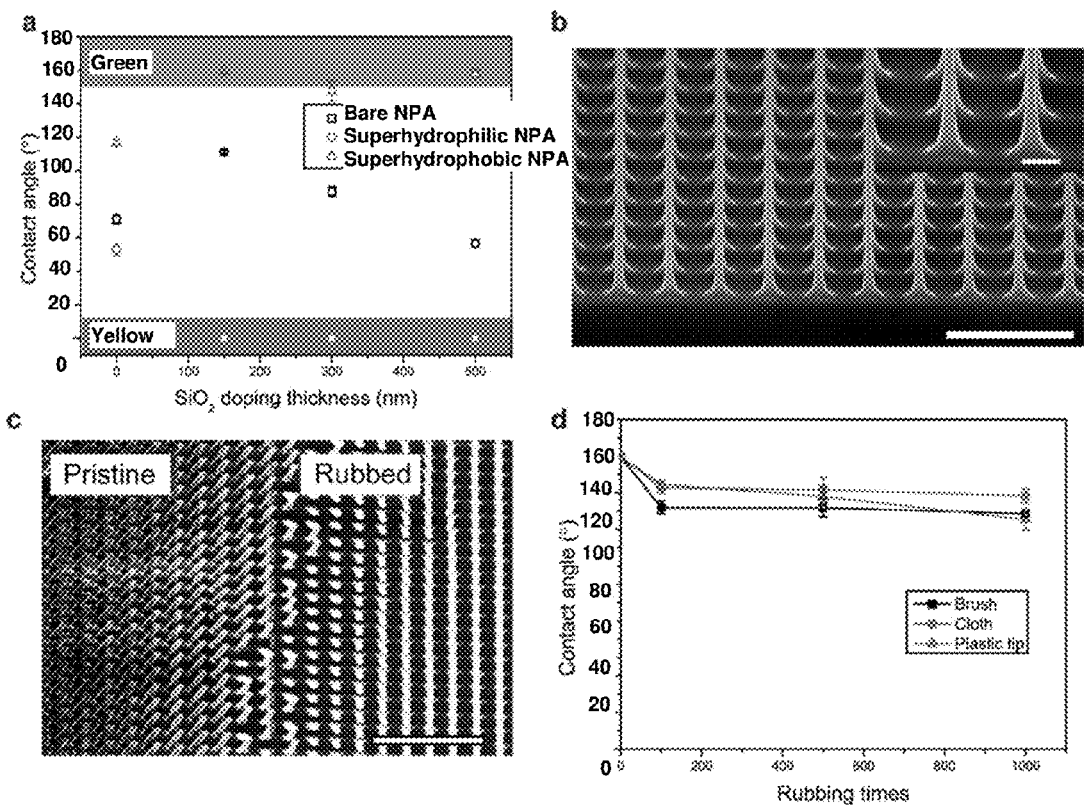

FIGS. 14(*a*)-14(*d*). FIG. 14(*a*) shows overall changes in contact angle (CA) for water corresponding to different nanopillar structures for use as authentication features, including a superhydrophobic coating (upper green region) and a superhydrophilic coating (lower yellow region). SEM images of pristine nanopillar arrays just after formation are shown in FIG. 14(*b*) and after rubbing the nanopillar arrays by finger FIG. 14(*c*). Scale bars are 5 µm and 500 nm for inserted image. FIG. 14(*d*) shows CA change over repeated mechanical rubbing using different material.

Figures 15A, 15B:
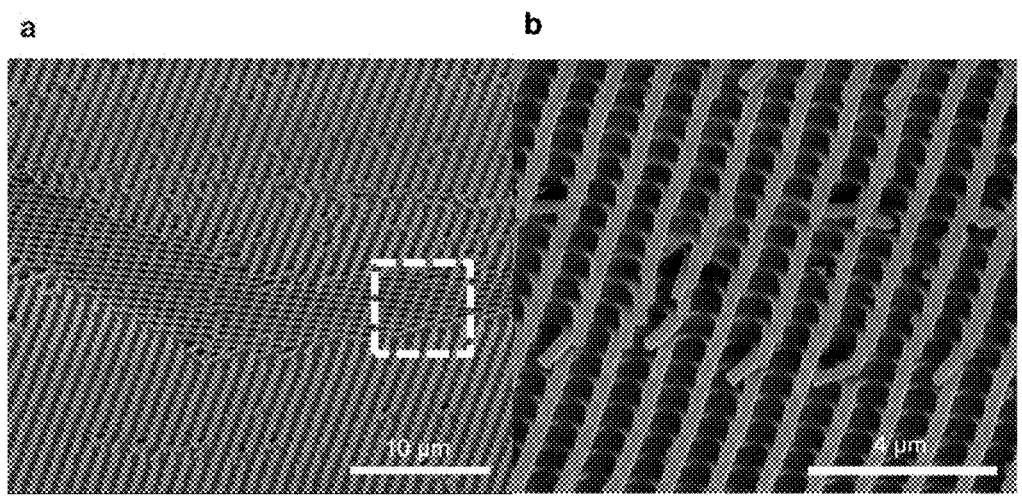

FIGS. 15(*a*)-15(*b*) show different magnifications of SEM images for nanopillar arrays for use authentication features after rubbing with a finger. FIG. 15(*b*) is a magnified image of the selection region in FIG. 15(*a*). The scale indicated by the scale bar is 10 µm in FIGS. 15(*a*) and 4 µm in FIG. 15(*b*).

Figures 16A, 16B, 16C, 16D, 16E:
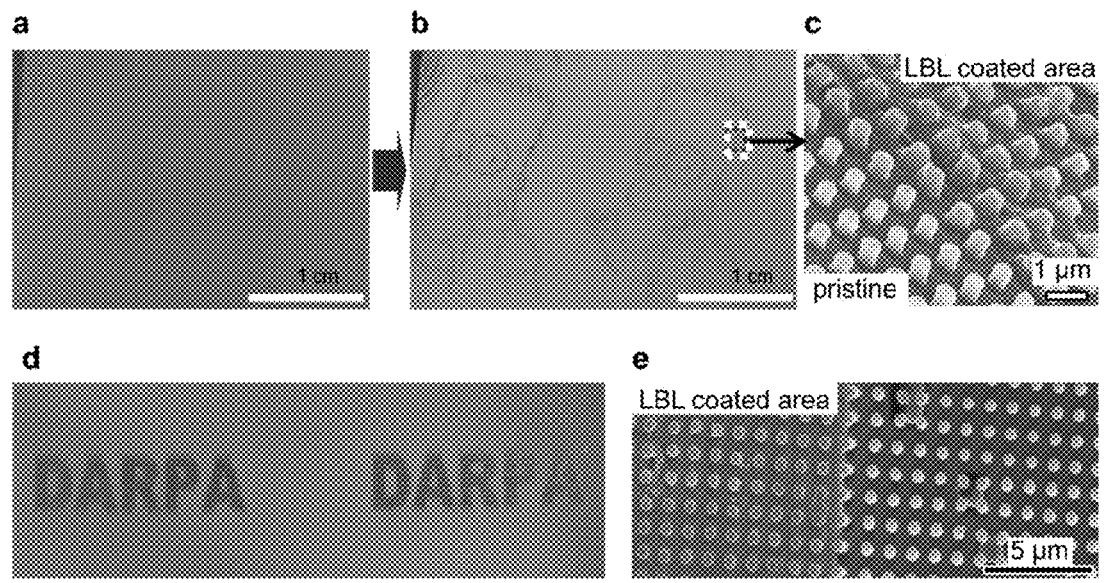

FIGS. 16(*a*)-16(*e*) show hidden and overt images printed on nanopillar arrays using inkjet LBL deposition for use as an authentication features in accordance with certain variations of the present disclosure. Photographs of the nanopillar array with a hidden graphic image before breathing on it is shown in FIG. 16(*a*). FIG. 16(*b*) shows the same surface after breathing on it, where the authentication feature design appears. FIG. 16(*c*) shows an SEM image of an edge of the design taken from the select region of FIG. 16(*b*) demonstrating the difference between pristine (untreated) and LBL-coated nanopillars. A photograph of a logo type graphic ink-jet authentication feature printed on a nanopillar array formed of PUNO polymer is shown in FIG. 16(*d*). FIG. 16(*e*) is an SEM of a region of the nanopillar array at an edge of the letter forming the authentication feature, demonstrating the difference between pristine and LBL-coated nanopillar regions.

Figures 17A, 17B:
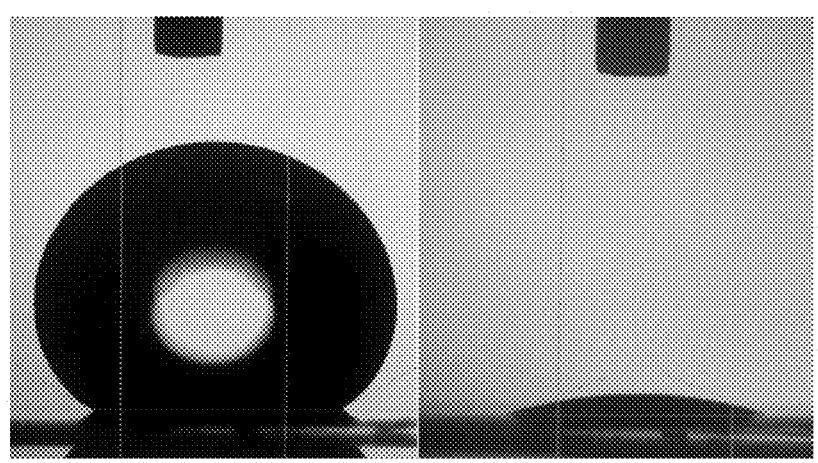
Figures 18A, 18B:
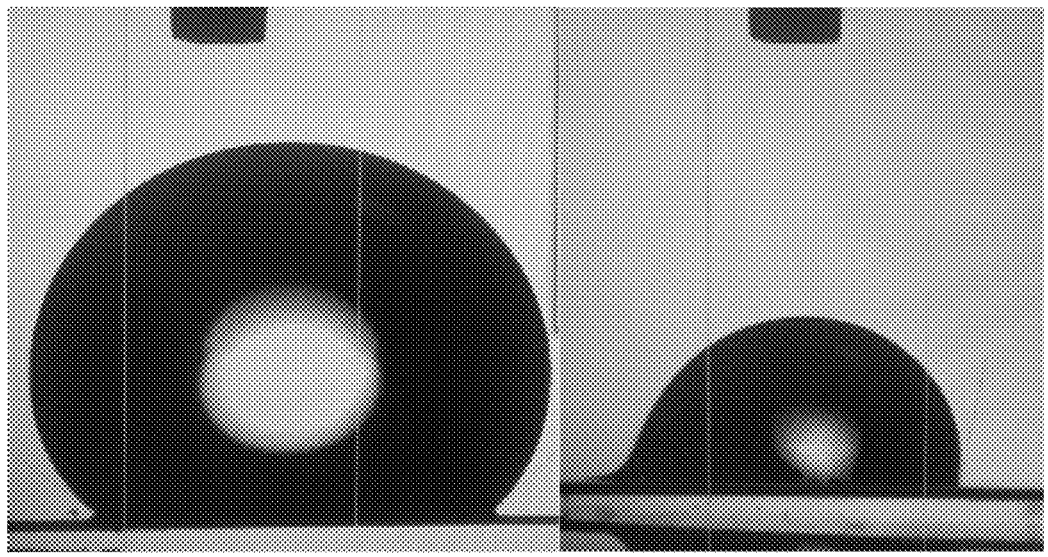
Figure 19:
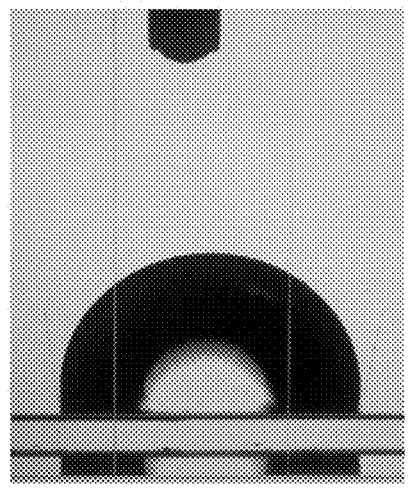
Figure 20:
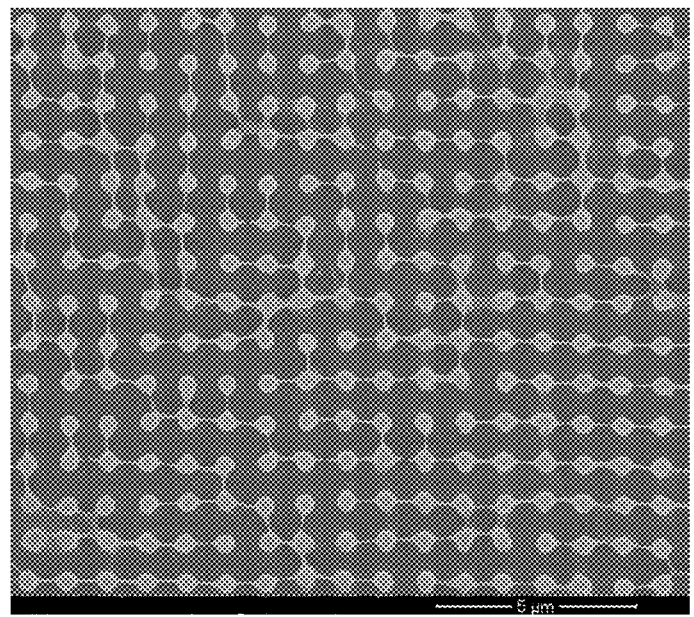
Figure 21:
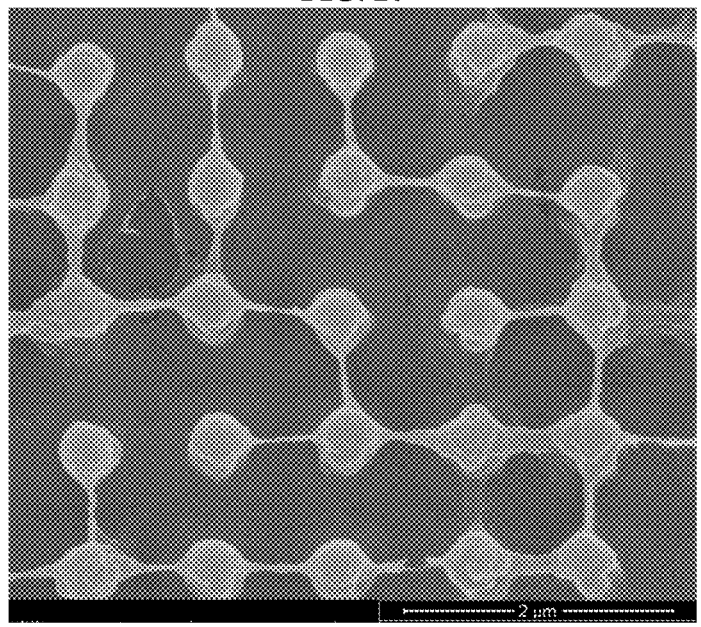

FIGS. 17(*a*)-17(*b*) show a change in contact angles for a water droplet (with a volume of about 20 µL) over time for a first sample that is a superhydrophobic nanopillar array without any treatment. FIG. 17(*a*) shows an initial contact angle of about 150°. FIG. 17(*b*) shows a contact angle after about 2.5 hours where the contact angle is about 21°;

FIGS. 18(*a*)-18(*b*) show a change in contact angles for a water droplet (with a volume of about 20 µL) over time for a second sample of a superhydrophobic nanopillar array on a sheet that has been dip-coated via a layer-by-layer technique to form a hydrophobic gradient. FIG. 18(*a*) shows an initial contact angle of about 140°. FIG. 18(*b*) shows a contact angle after about 2.5 hours where the contact angle is about 101°;

FIG. 19 shows a contact angle for a water droplet (with a volume of about 10 µL) for a third sample of a superhydrophobic nanopillar array on a sheet that has been dip-coated via a layer-by-layer technique to form a hydrophobic gradient. FIG. 19 shows an initial contact angle of about 100°;

FIG. 20 shows an SEM image of a nanopillar array comprising a plurality of nanopillars that include a plurality of bridge structures formed between respective nanopillars on a surface of an article in accordance with certain the principles of the present disclosure. The scale bar is 5 µm; and FIG. 21 shows a magnified SEM image of a select region of the nanopillar array of FIG. 20 having the plurality of bridge structures between respective nanopillars on the surface of the article. The scale bar is 2 µm.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the Figures. Spatially relative terms may be intended to encompass different orientations of the device in use or operation in addition to the orientation depicted in the Figures. For example, if the device in the Figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range, including endpoints and sub-ranges given for the ranges.

Example embodiments will now be described more fully with reference to the accompanying drawings.

The present technology provides the ability to mark various articles and goods with a new form of authentication, providing a superior level of protection against counterfeiting and permitting enhanced ability to control authenticity. Thus, in certain aspects, the present disclosure provides an authentication feature disposed on a surface of an article. Such authentication features may be readily detected by a human, such as those in a supply or distribution chain or by a consumer or end user. For example, in certain aspects, the authentication feature may be detected once exposed to a vapor, condensate, or moisture, for example, water vapor from human breath. Thus, in such variations, the authentication feature is covert and does not affect the aesthetic appearance of the article until intentional application of breath or water vapor to the region near the authentication feature, which can then be readily detected by consumers or end users without the need to use any specialized detection equipment. In other aspects, the authentication feature may be visible without the application of condensate to the surface of the article. The methods of forming the authentication features according to the present disclosure are relatively low cost, robust, capable of being applied to a wide variety of different materials and surfaces, difficult for counterfeiters to replicate and/or forge, and enable superior authenticity verification and thus protection against counterfeiting.

In certain aspects, the present disclosure provides an article having an authentication feature. The article to be authenticated or provided with an anti-counterfeit measure has at least one surface on which the authentication feature is formed. It should be noted that the article with the surface may also be a distinct tag or another component associated with an article to be authenticated (e.g., packaging, a sticker, tape, or the like). An array of nanopillars is disposed on a region of the surface. The array of nanopillars may define a pattern, thus creating and defining the authentication feature that is visible and capable of detection when exposed to a fluid comprising water vapor that condenses thereon (e.g., human breath). It should be noted that vapor may include liquid or solid particles dispersed or suspended in a gas or fluid, as well as gases capable of forming condensate on a surface having a nanopillar array. In certain variations, the vapor comprises water. In certain preferred variations, the vapor is human breath comprising water, where the authentication feature may be considered to be breath-activated.

An array of nanopillars comprises a plurality of axial geometry particles or objects disposed on a substrate. In various embodiments, the axial geometry pillars are anisotropic and have a cylindrical, rod, tube, or fibrous shape with an evident elongated longitudinal axis, which is longer than the other dimensions (e.g., diameter or width), thus having an axial anisotropic geometry. Generally, an aspect ratio (AR) for cylindrical shapes (e.g., a pillar, a rod, tube, fiber, etc.) is defined as AR=L/D, where L is the length of the longest axis (here the major longitudinal axis) and D is the diameter of the cylinder or pillar. Suitable axial geometry particles for use in the present technology generally have high aspect ratios, for example, ranging from at least about 1 to in excess of 1,000, for example. In yet other aspects, such axial geometry particles may have an aspect ratio of 5,000 or more and in certain variations 10,000 or more. The axial geometry particles will generically be referred to as pillars herein. It should be noted that the pillars may have a cylindrical shape, but may also have additional shapes so long as the particle defines an axial geometry, for example, having pyramidal shapes, spiky shapes, or rounded, beveled, or graduated upper regions.

In certain aspects, the plurality of pillars comprises microparticles or nanoparticles. A "microparticle" as used herein encompasses "nanoparticles," as discussed below. In certain variations of the present teachings, a microparticle component has an axial geometry with an evident longitudinal axis, as defined above, and further has at least one spatial dimension that is less than about 1,000 μm (i.e., 1 mm), optionally less than or equal to about 100 μm (i.e., 100,000 nm). The term "micro-sized" or "micrometer-sized" as used herein is generally understood by those of skill in the art to mean less than about 500 μm (i.e., 0.5 mm). As used herein, a microparticle has at least one spatial dimension that is less than about 100 μm (i.e., 100,000 nm), optionally less than about 50 μm (i.e., 50,000 nm), optionally less than about 10 μm (i.e., 10,000 nm), and in certain aspects less than or equal to about 5 μm (i.e., 5,000 nm). In certain variations, a microparticle component has at least one spatial dimension that is less than or equal to about 1,000 µm, optionally less than or equal to about 100 µm, optionally less than or equal to about 50 µm, and in certain embodiments, less than or equal to 10 µm.

In certain preferred aspects, the plurality of pillars comprises nanoparticles. Particles that are "nano-sized" or "nanometer-sized" as used herein are generally understood by those of skill in the art to have at least one spatial dimension that is less than about 50 µm (i.e., 50,000 nm), optionally less than about 10 µm (i.e., 10,000 nm), optionally less than about 2 µm (i.e., less than about 2,000 nm), optionally less than or equal to about 1 µm (i.e., less than about 1,000 nm), optionally less than about 0.5 µm (i.e., 500 nm), and in certain aspects, less than about 200 nm. Accordingly, a nanoparticle component has at least one spatial dimension that is greater than about 1 nm and less than about 50,000 nm (50 µm). In certain variations, a nanoparticle may have at least one spatial dimension of about 5 nm to about 5,000 nm. In certain variations, at least one spatial dimension of the nanocomponent is about 20 nm to about 2,000 nm. In still other variations, nanocomponents have at least one spatial dimension of about 50 nm to about 500 nm. Such nanoparticle components are intended to encompass components having a micro-scale, so long as at least one dimension of the particle is less than about 50 µm. It should be noted that so long as at least one dimension of the nanoparticle falls within the above-described nano-sized scale (for example, diameter), one or more other axes may well exceed the nano-size (for example, length and/or width). As used herein, unless otherwise indicated, the terms micropillar and nanopillar, or microparticle and nanoparticle, are used interchangeably.

In certain preferred aspects, the axially-shaped particles of the plurality of axially-shaped microparticles have substantially the same orientation relative to a substrate on which they are disposed. For example, in certain aspects, each axially-shaped microparticle of the plurality respectively defines a major longitudinal axis that intersects with a plane defined by a substrate and has substantially the same vertical orientation relative to a horizontal plane formed by the substrate. In certain preferred aspects, the axially-shaped particles of the plurality have substantially the same vertical orientation relative to a horizontal plane formed by the substrate.

FIG. 1 depicts an exemplary schematic of a nanopillar array forming an authentication feature 20 according to certain aspects of the present teachings. A surface 21 of an article or object has a region 22 in which a plurality of axially-shaped microparticles or pillars 24 are disposed thereon as an array. By an array, it is meant that a plurality of pillars 24 is disposed on surface 21 in a regular predetermined pattern. An average spacing between the pillars 24 is designated "d" and an average diameter of the pillars 24 is designated "e." Notably, some variation in "d" and "e" may occur. The region 22 on surface 21 is typically exposed and outwardly visible, although in certain alternative variations, the region 22 may be concealed.

In certain variations, each axially-shaped nanopillar 24 of the plurality respectively defines a major longitudinal axis ("a") that intersects with a horizontal plane (corresponding to the x-y axes) defined by surface 21 at an angle designated "b." In certain aspects, the plurality of axially-shaped pillars 24 is substantially vertical with respect to the horizontal plane formed by the surface 21. However, in certain variations, any angle b may be employed if the volume ratio is kept sufficiently low. In certain embodiments, the major longitudinal axis "a" defines an average angle "b" for the plurality of axially-shaped pillars 24 that ranges from greater than or equal to about 30° to less than or equal to about 90°.

As shown in FIG. 1, a first axially-shaped nanopillar 30 has a first major longitudinal axis designated "a1" and a first diameter "e1." A second axially-shaped nanopillar 32 likewise has a second major longitudinal axis designated "a2" and second diameter "e2," while a third axially-shaped nanopillar 34 has a third major longitudinal axis designated "a3" and a diameter of "e3."

In certain variations, an average height along the major longitudinal axis ("a") of the nanopillars 24 is greater than or equal to about 200 nm, optionally greater than or equal to about 300 nm, optionally greater than or equal to about 400 nm, optionally greater than or equal to about 500 nm, optionally greater than or equal to about 600 nm, and in certain variations, optionally greater than or equal to about 700 nm. In certain variations, the nanopillars have an average diameter of greater than or equal to about 500 nm to less than or equal to about 1 µm.

In certain variations, an average diameter ("e") of the nanopillars 24 is greater than or equal to about 50 nm to less than or equal to about 1 µm. In certain variations, an average diameter of the nanopillars is less than or equal 900 nm, optionally less than or equal to about 800 nm, optionally less than or equal to about 700 nm, optionally less than or equal to about 600 nm, and in certain variations, optionally less than or equal to about 500 nm. In certain variations, the nanopillars have an average diameter of greater than or equal to about 50 nm to less than or equal to about 600 nm.

It should be appreciated that in certain variations of the present disclosure, coatings may be applied to the as-formed nanopillars that may add to the overall diameter and dimensions specified herein. For example, nanometer-scale thick coatings do not change the appearance of the nanopillars or their periodicity and therefore the region comprising the nanopillar array remains virtually invisible. However, the presence of certain coatings may strongly change local water or liquid contact angle, thus enabling detection of otherwise hidden graphics or images (defined by the presence of nanopillars) when liquid or water vapor condenses on the surface. As the coatings become thicker, the space between the nanopillars "d" becomes filled and smaller, so that the images or graphics on the surface become highly visible without the need for the presence of condensate to view the pattern. The periodic arrays of nanopillars in accordance with the present teachings can thus be designed to have interesting optical properties and attractive designs by controlling spacing "d" between respective nanopillars 24.

There may be some amount of variation in the angles b of each longitudinal axis a due to variances in manufacturing. First and second major longitudinal axes a1 and a2 are considered to be "substantially aligned" with one another along a predetermined orientation when the angle formed between them (shown as offset angle Θ in the inset, FIG. 2, between exemplary axes a1 and a2) is less than or equal to about 15°, optionally less than or equal to about 10°, optionally less than or equal to about 9°; optionally less than or equal to about 8°; optionally less than or equal to about 7°; optionally less than or equal to about 6°. In certain preferred embodiments, offset angle Θ formed between first and second major longitudinal axes a1 and a2 is less than or equal to about 5°; optionally less than or equal to about 4°; optionally less than or equal to about 3°; optionally less than or equal to about 2°; and optionally less than or equal to about 1°. As can be appreciated by those of skill in the art, a plurality of axially-shaped pillars 24 can be considered to be "substantially aligned" in a predetermined single orientation when an average offset angle Θ is small and less than the amounts specified above, although individual pillars may have major longitudinal axes that intersect with a horizontal plane of the substrate at a greater angle "b" and therefore have a greater angle of deviation from the longitudinal axes of the other microparticles than those specified.

In certain aspects, the material that forms the nanopillars is a strong material. "Young's modulus" is a mechanical property referring to a ratio of stress to strain for a given material. Young's modulus may be provided by:

$$E=(\text{stress})/(\text{strain})=\sigma/\epsilon=L_O/\Delta L \times F/A,$$

where engineering stress is σ, tensile strain is ε, E is the Young's modulus, $L_O$ is an equilibrium length, ΔL is a length change under the applied stress, F is the force applied and A is the area over which the force is applied.

In certain aspects, materials used to form the nanopillars are strong and capable of withstanding high levels of strain without breakage. In certain aspects, the nanopillars comprise a polymeric material. The nanopillars may comprise an elastomeric polymeric material. The polymeric material used to create the nanopillars enables formation of an array including a plurality of nanopillars that is substantially free of physical defects, including nanopillar breakage, rips, tears, voids, wrinkles, and other irregularities. The term "substantially free" as referred to herein is intended to mean that defects are absent to the extent that that undesirable and/or detrimental effects on the aesthetics and durability of authentication features are avoided. In certain aspects, the nanopillars are substantially free of physical defects and have substantially similar consistent volumes, for example, having an average deviation of less than or equal to about 25% in volume of the overall plurality of formed nanopillars in the array, optionally less than or equal to about 20% by volume, optionally less than or equal to about 15% by volume, optionally less than or equal to about 10% by volume, optionally less than or equal to about 5% by volume, optionally less than or equal to about 4% by volume, optionally less than or equal to about 3% by volume, and in certain variations, optionally less than or equal to about 1% by volume deviation among the nanopillars formed in accordance with the present technology.

Therefore, the nanopillars may be formed of a material that may exhibit or undergo a maximum or ultimate tensile strength ($\sigma_{ult}$) of greater than or equal to about 2.5 MPa without fracturing, optionally greater than or equal to about 3 MPa without fracturing, optionally greater than or equal to about 4 MPa without fracturing, optionally greater than or equal to about 5 MPa without fracturing, optionally greater than or equal to about 6 MPa without fracturing, optionally greater than or equal to about 7 MPa without fracturing, optionally greater than or equal to about 8 MPa without fracturing, optionally greater than or equal to about 9 MPa without fracturing, optionally greater than or equal to about 10 MPa without fracturing, and in certain embodiments, greater than or equal to about 11 MPa without fracturing, as will be described in more detail below. Notably all physical properties listed in the present disclosure are at room temperature (e.g., about 21° C.) and ambient pressure conditions, unless otherwise noted.

In certain aspects, the nanopillars are formed of a material that may exhibit or undergo a maximum tensile strain ($\epsilon_{max}$) of at least about 100% without fracturing, optionally greater than or equal to about 125% without fracturing, optionally greater than or equal to about 150% without fracturing, optionally greater than or equal to about 175% without fracturing, optionally greater than or equal to about 200% without fracturing, optionally greater than or equal to about 225% without fracturing, optionally greater than or equal to about 250% without fracturing, optionally greater than or equal to about 275% without fracturing, optionally greater than or equal to about 300% without fracturing, and in certain embodiments, greater than or equal to about 320% without fracturing, as will be described in more detail below.

In yet other aspects, the nanopillars are formed of a material that may have a Young's modulus (E) of greater than or equal to about 10 MPa without fracturing, optionally greater than or equal to about 11 MPa without fracturing, optionally greater than or equal to about 12 MPa without fracturing, optionally greater than or equal to about 13 MPa without fracturing, optionally greater than or equal to about 14 MPa without fracturing, optionally greater than or equal to about 15 MPa without fracturing, optionally greater than or equal to about 16 MPa without fracturing, optionally greater than or equal to about 17 MPa without fracturing, optionally greater than or equal to about 18 MPa without fracturing, optionally greater than or equal to about 19 MPa without fracturing, optionally greater than or equal to about 20 MPa without fracturing, optionally greater than or equal to about 21 MPa without fracturing, optionally greater than or equal to about 22 MPa without fracturing, optionally greater than or equal to about 23 MPa without fracturing, and in certain embodiments, greater than or equal to about 24 MPa without fracturing, as will be described in more detail below.

The nanopillars are desirably formed of a polymeric material that exhibits such physical properties, including Young's modulus, maximum or ultimate tensile strength ($\sigma_{ult}$), and maximum tensile strain ($\epsilon_{max}$) in the ranges specified above. Suitable polymers having the desired physical properties, including Young's modulus, maximum or ultimate tensile strength ($\sigma_{ult}$), and maximum tensile strain ($\epsilon_{max}$), may include polyurethane acrylate, epoxy, urethane-based polymers, such as a urethane-based mercapto ester polymer like Norland Optical Adhesive NOA 63 commercially available from Norland Products, Inc., which is a clear, colorless, liquid urethane-based polymer comprising mercapto-esters curable by exposure to ultraviolet radiation. Any combinations of these polymers are likewise contemplated by the present disclosure. One particularly suitable combination is polyurethane acrylate and a urethane-based polymer, like a urethane-based mercapto ester polymer (e.g., NOA 63).

In certain variations, the combination comprises greater than or equal to about 50 to less than or equal to about 95% by volume polyurethane acrylate and greater than or equal to about 5 to less than or equal to about 50% by volume of urethane-based mercapto ester polymer, optionally greater than or equal to about 60% by volume to less than or equal to about 80% by volume polyurethane acrylate and greater than or equal to about 20% by volume to less than or equal to about 40% by volume urethane-based mercapto ester polymer, optionally greater than or equal to about 65% by volume to less than or equal to about 75% by volume polyurethane acrylate and greater than or equal to about 25% by volume to less than or equal to about 35% by volume urethane-based mercapto ester polymer, and in certain variations about 70% by volume polyurethane acrylate and about 30% by volume urethane-based mercapto ester polymer.

The nano structure of a surface can determine the surface's wetting behavior. In certain aspects, a region of a surface having a plurality of nanopillars (e.g., an array of nanopillars) is hydrophobic (repels polar solvents, such as water). In certain aspects, at least a portion of the nanopillars may further have one or more surfaces that are treated or coated after formation to impart distinct properties. Techniques for applying such coatings will be discussed in greater detail below. Different nanopillars in the array may have different coatings applied.

In certain variations, at least one surface region of the nanopillar can be designed to have one or more of the following properties based upon material selection: hydrophobic, superhydrophobic (for example having with water contact angles in excess of 150°), hydrophilic, superhydrophilic (for example, where a water contact angle is near or at 0°), olephobic/lipophobic, olephilic/lipophilic, omniphilic, omniphobic, positively-charged (cationic), negatively-charged (anionic), polyethylene glycol (PEG)-ylated, coated with a zwitterion, nanostructured, optical properties, such as special absorption colors, luminescent colors, up conversion, infrared radiation (IR) emission, radioactivity, magnetic codes or patterns, among others. Thus, in certain aspects, a coating formed on a surface of a nanopillar may comprise a nanoparticle that provides certain desired properties. Suitable nanoparticles for nanopillar coatings may be selected from a group consisting of: semiconductor nanoparticles, magnetic nanoparticles, metallic nanoparticles, plasmonic nanoparticles, chiral nanoparticles, catalytic nanoparticles, chemically reactive nanoparticles, oxide nanoparticles, luminescent nanoparticles, infrared radiation (IR) or other radiation absorbing nanoparticles, spiky nanoparticles, scattering nanoparticles, supraparticles, polymeric nanoparticles, swellable nanoparticles, and combinations thereof, by way of non-limiting example. In other aspects, one or more polymers or materials used within a nanopillar may be functionalized or subsequently undergo reactions with moieties or substances to provide desired surface properties or to contain various moieties presented on the nanopillar surface.

In certain aspects, the coatings applied to at least one surface of a nanopillar may have a thickness of less than or equal to about 1 μm, optionally less than or equal to about 750 nm, optionally less than or equal to about 500 nm, optionally less than or equal to about 400 nm, optionally less than or equal to about 300 nm, optionally less than or equal to about 200 nm, optionally less than or equal to about 100 nm, optionally less than or equal to about 75 nm, optionally less than or equal to about 50 nm, and in certain variations, optionally less than or equal to about 30 nm. As noted above, as the coatings become thicker on the nanopillars, the images or graphics on the surface become highly visible without the need for the presence of condensate to view the pattern.

The methods of applying nanopillars to surfaces according to certain aspects of the present disclosure have great versatility and may be applied to a wide variety of surfaces. For example, surfaces on which the nanopillars are formed may be selected from a wide variety of materials, including textiles, fibers, leather, plastics and polymers, metals, ceramic, glass, wood, cardboard, paper, and the like. In certain variations, the nanopillar array defining the authentication feature may be directly applied to a surface of the article to be authenticated, while in other variations the nanopillar array defining the authentication feature may be applied to a tag or other component that will be associated with the article to be authenticated or protected from counterfeiting (e.g., product packaging).

The nanopillar-based authentication feature can include breath-activated images or labels, which are versatile, attractive, and economical. Depending on the manufacturing steps, the authentication feature labels can have a myriad of visual appearances. In certain aspects, the authentication features of the present disclosure are formed by a nanomolding process to form an array of nanopillars is formed on a surface of an article or object, which can take advantage of a master mold made by photolithography at specialized facilities. It is exceptionally difficult to replicate such authentication features having nano scale features, as highly sophisticated nanomanufacturing equipment is required. At the same time, the costs for manufacturing are expected to be relatively small. Importantly, nanopillars arrays can be designed to have an attractive appearance with rainbow-like colors (as discussed below) originating from the diffraction of visible light in optical media with periodic variations of refractive index and characteristic lengths comparable to the wavelength of visible photons. In certain aspects, the present disclosure can employ wetting properties of a surface-modified nano structured substrate (e.g., having the array of nanopillars disposed thereon).

The array of nanopillars can be highly customized and have an aesthetically pleasing and attractive appearance, which can be useful in various industries, especially for the fashion industry. The authentication images can be created by a simple ink-jet printing process. Furthermore, in certain aspects, the authentication feature images may be hidden, rather than overtly exposed. The images may be revealed by exposure to condensate or moisture, such as humidity or human breath (e.g., breath-activated images). In other aspects, the authentication feature images or graphics may be fully visible without any condensation on the surface. An additional advantage is that the authentication features formed in accordance with various aspects of the present teachings are highly durable and resistant to rubbing. The possibility for counterfeiting or substitution or other unauthorized actions in relation to authentic products that are marked in accordance with the present technology is thus significantly reduced.

In certain aspects, a mask defining a pattern of a plurality of nanopillars (e.g., a nanopillar array) can be made using by pouring a curable elastomer precursor onto an existing nanopillar array. This mask is removed from the existing nanopillar array. The mask can then be filled by a precursor (e.g., a polyurethane precursor) and subsequently cured with actinic radiation or energy (e.g., UV light). Such a process produces a polymeric copy (e.g., of polyurethane) of the original nanopillar array. Polyurethane nanopillar arrays prepared in accordance with certain aspects of the present disclosure demonstrate great wear resilience. Such periodic arrays of nanopillars have interesting optical properties and can be made to have attractive designs by controlling spacing between respective nanopillars. Moreover, nanopillar arrays formed by such methods demonstrate great wear resilience. For example, polyurethane nanopillars formed in this manner can retain superhydrophobic properties even after aggressive rubbing for as many as 1,000 cycles.

Once made, the polyurethane nanopillar array can be subjected to subsequent layer-by-layer (LbL) modification. Additionally, the methods of the present disclosure may further comprise printing of ink designs with different hydrophilic and hydrophobic domains (e.g., by ink-jet printing). As noted above, a nanostructured surface of an article having a nanopillar array in accordance with certain aspects of the present disclosure tends is hydrophobic (repelling polar solvents, including water). After formation of the nanopillars, layer-by-layer films can be deposited. In certain aspects, such layer-by-layer films may be deposited with ink-jet printers. Thus, LbL deposition of hydrophilic layers onto the nanopillar-structured substrate renders it wettable by polar solvents. The present disclosure further contemplates using different kinds of hydrophilic chemicals. Ink-jet printing of custom designs with domains that have different wetting properties for different liquids allows design of hidden images onto the regions of the surface having a nanopillar-structured array. Increasing the vapor content or humidity (such as with human breath) of the atmosphere near the region having the surface-modified nanopillar arrays can cause the water vapor or liquid to condense in certain domains (e.g., hydrophilic domains). Beading of water or liquid droplets increases the scattering of light, revealing the covert or hidden design. In this regard, authentication is inexpensive, because there is no need for expensive equipment used to authenticate the features or tags, in that human breath suffices to reveal the authentication feature. The authentication features according to various aspects of the present technology can also be readily combined with existing track and trace technologies for multilevel security devices, as needed.

Furthermore, nanopillar arrays may interact with light, producing visible, attractive iridescent designs, which might be incorporated into the design of the product, especially if used for clothes, accessories, and consumer goods where unique appearance and aesthetics are important. Thus, in certain aspects, the authentication feature may be used on or form tags, labels, brand designs and logos, among others. Furthermore, the nanopillar arrays can be easily embedded into purses, clothes, and accessories, due to its attractive iridescent appearance. In such embodiments, an anti-counterfeit authentication feature can then contribute to making a product attractive to the consumer and for advertising and marketing. Nanopillar-structured surfaces can also serve as anti-biofouling coatings, as well as self-cleaning surfaces. Thus, in addition to serving as an anti-counterfeiting or authentication measure, surfaces of articles, such as electronic devices, can be formed of self-cleaning coatings comprising nanopillar arrays. Likewise, surfaces of medical devices could have dual-purpose nanopillar array coatings that serve as an authentication feature and as an anti-biofouling coating.

Surface nanoscale features having an aspect ratio (AR) greater than or equal to about 1 (height/width) can strongly affect adhesion, charge and heat transfer, light scattering, tribology, liquid flow, wetting, cellular interactions, and many other processes at their interfaces. These effects can be observed in nanopillar arrays (NPAs), which can serve as a convenient tool for engineering the electrical, mechanical, and optical properties for flexible/wearable electronics, energy storage devices, solar cells, biosensors, dry adhesives, and other applications. Nanopillar arrays made from polymers are particularly attractive, as compared to those formed of silicon, ZnO, carbon nanotube nanopillar arrays, because of the brittleness and opaqueness of these alternative materials.

Soft lithography based on poly(dimethylsiloxane) (PDMS) elastomers has been attempted to produce micro- and nanoscale surface features, such as nanopillar arrays. While enabling fundamental advances, PDMS is not an ideal material for constructing nanopillars. PDMS suffers from poor adhesion with various substrates, including paper, aluminum foil, polymer film and glass occurs. The same properties that make PDMS nanopillar arrays useful for studies of enhanced adhesion and tribology hinder their large-scale production. For example, PDMS has a Young's modulus of less than 10 MPa and an ultimate tensile strength ($\sigma_{ult}$) of less than 2.4 MPa. Thus, PDMS nanopillars with high aspect ratios are easily torn off from the substrate due to adhesion forces between each nanopillar and its mold. Poor mechanical strength of PDMS and its strong affinity to silicon oxide surfaces obstruct successful, single-step detachment from templates. Single-step detachment processes result in PDMS nanopillars that are highly damaged and ripped.

Consequently, a staged process with multiple lithography cycles, adding a sequence of thin strata to growing nanopillars—similar to constructing a multilevel building—is currently used to make nanoscale features. This technique can create complex three-dimensional (3D) structures; however, it is done at the expense of both excessive time and low yield. Furthermore, successful transfer of sculpted PDMS onto other substrates in a continuous fashion as required for the many applications is difficult or impossible due to low adhesion to non-silicon-based materials, such as other plastics, fabric, metal foil, and others.

Manufacturing of large-area nanopillar arrays over universal substrates in a single step replication process is thus contemplated here. Thus, there is a need for an alternative polymeric material provided by certain aspects of the present disclosure that (1) improves the adhesion between the polymer and target substrates or surfaces, and (2) provides scalable production of nanopillar arrays. Thus, the material used to form the nanopillar array ideally satisfies contrarian requirements of mechanical properties and strong adhesion, which are both desirable and undesirable. In one variation, a suitable polymeric blend comprises polyurethane acrylate (PU) and NOA63 adhesive, as discussed above. The PU-NOA63 blend is denoted here as "PUNO." This material balances the conflicting requirements discussed above and permits formation of nanopillar arrays in a scalable, single-step replication process. In addition to being able to make replica sheets from wafers as large as eight inches in diameter, the PUNO-based nanopillar arrays can be easily transferred onto a variety of substrates. The strength and toughness of PUNO nanopillars is also demonstrated in the flexile and shear-resilient surfaces capable of withstanding harsh mechanical conditions. Furthermore, the nanopillar arrays form a convenient substrate for surface modification using ink-jet layer-by-layer deposition (LBL) that enables creating hidden images based on controlled wetting behavior.

In certain aspects, the present disclosure contemplates methods of making an authentication feature comprising an array of nanopillars. In certain variations, the present disclosure provides methods of making an article having an authentication feature, where the method first comprises applying a polymeric precursor to a mold comprising an array of nanoholes, where the polymeric precursor ideally fills most or all of the void spaces formed by the nanoholes. The polymeric precursor may be a precursor of any of the polymers discussed above for forming nanopillars.

Such a polymeric precursor material can be applied by spin-casting or spin-coating, or by other known techniques for applying polymer precursor include jetting, spraying, and/or by gravure application methods, by way of non-limiting example. In certain preferred variations, the applying may be by spin-casting or spin-coating, by way of example. Next, a surface of the article is disposed against the mold in contact with at least a portion of the polymeric precursor, for example a portion of the polymeric precursor on the upper portions of the nanoholes and/or upper surface of the mold. The polymeric precursor is then partially or fully cured and/or cross-linked by application of actinic radiation (e.g., ultraviolet radiation), energy (e.g., e-beam), heat, pressure, and the like. After the curing and/or crosslinking step, the polymeric precursor thus forms a polymeric material. Next, the surface of the article is removed and separated from the mold so that the surface comprises an array of nanopillars disposed thereon that defines the authentication feature. This results in formation of an array of nanopillars that is substantially free of defects. The array of nanopillars thus defines a pattern on the surface of the article that serves as an authentication feature. In certain variations, the authentication feature is only visible to detection when moisture or condensate forms thereon, but is invisible in the absence of such condensate.

In certain alternative variations, a method of making an authentication feature comprising an array of nanopillars includes applying a polymeric precursor to a mold comprising an array of nanoholes, which ideally fills most or all of the void spaces formed by the nanoholes, similar to the method described just above. The polymeric precursor is then partially cured or cross-linked by application of actinic radiation (e.g., ultraviolet radiation) or energy (e.g., e-beam) or the like. After partial curing, a surface of the article may be disposed against the mold in contact with at least a portion of the partially cured polymeric precursor, for example a portion of the polymeric precursor on the upper portions of the nanoholes and/or upper surface of the mold. The partially cured polymeric precursor may have preferential adherence to the substrate and thus, the substrate and partially cured polymeric precursor can be removed (released) from the mold. After removal from the mold, the partially cured polymeric precursor may then be fully cured and/or cross-linked by application of actinic radiation (e.g., ultraviolet radiation), energy (e.g., e-beam), heat, or the like. After curing, the polymeric precursor thus forms a polymeric material defining an array comprising a plurality of intact nanopillars disposed on the surface of the substrate (e.g., article) in a patter that defines the authentication feature. In certain variations, the authentication feature is only visible to detection when moisture or condensate forms thereon, but is invisible in the absence of such condensate. This process likewise results in formation of an array of nanopillars that is substantially free of defects.

In yet other methods, one or more of the nanopillars may be further surface treated to have different properties than the nanopillar material or the surface of the substrate. In one variation, a layer-by-layer method may be employed to create surface coatings on one or more regions of the nanopillars. Such a layer-by-layer process may be implemented by use of ink printing, such as ink jet printing, over select regions of the nanopillar array on the surface of the article.

Layer-by-layer assembly (LBL) provides a reliable method for fabricating coatings with favorable physical characteristics. The LBL technique is well known and relies on alternating adsorption of charged species or polyelectrolytes onto a substrate. Layers are built up by sequential dipping of a substrate into oppositely charged solutions having oppositely charged moieties that are attracted to the surface. Monolayers of individual components attracted to each other by electrostatic and van-der-Waals interactions are thus sequentially adsorbed on the target surface. LBL films can be constructed on a variety of solid substrates, thus imparting much flexibility for size, geometry and shape and further patterned or etched (with chemicals, plasma, electron beam, or high intensity lasers, for example). Additionally, LBL multilayers have both ionic and electronic conductivity that provides favorable charge transfer characteristics.

In an exemplary LBL method, a substrate has a first charge. A first charged material or moiety has a first polarity that is opposite to the charge of the substrate. By way of non-limiting example, the substrate may have a negative charge, while the first charged material has a positive charge. The first charged material is thus applied to substrate in a first step (Step 1), for example, by applying (e.g., ink jetting) the first charged material onto the regions of the substrate where the nanopillar array is present. The driving force is electrostatic attraction. Additional steps may occur between application steps, such as washing of the surface before application of the next material. After application of the first charged material to the substrate, the surface of the substrate can be exposed to a first wash material in Step 2, which is an optional step. Then, a second charged material or moiety having a second polarity opposite from the first polarity is applied over the first charged material in Step 3. The second charged material may likewise be applied by ink jetting onto the regions of the substrate corresponding to the nanopillar array. Then, the surface having both the first charged material and the second charged material disposed thereon can be exposed to a second wash material in Step 4, which like Step 2 is likewise optional.

Steps 1-4 serve as a single deposition cycle that may be repeated sequentially to build distinct alternating layers of the first charged material and second charged material. A composite material layer comprises the first charged material and the second charged material. Depending on the charge of the substrate, the first charged material may be either a polycation or a polyanion (so that it is attracted to and deposited onto the surface of the substrate). Thus, the second charged material is the other of the polycation or the polyanion, having an opposite charge to the first charged material. Accordingly, a composite coating or material is formed by LBL is often referred to as: (polyanion/polycation)$_n$, where n represents the number of deposition cycles or layers present. LBL thus provides a simple tool for making thin film coating structures having homogeneously dispersed, well organized layered structures with high levels of both polyanion and polycation.

In certain aspects of the present disclosure, a first charged material or moiety may be a polyanion, poly(sodium 4-styrenesulfonate) (PSS) with a negative charge that may be applied to the untreated nanopillar material as formed. Of course, as appreciated by those of skill in the art, whether the first charged material is anionic or cationic depends on the material used to form the nanopillar. For example, polyurethane-based materials tend to have a positive charge. A polycation in the form of poly(diallyldimethylammonium) chloride (PDDA) that has a strong positive charge that is complementary to the negative charge of PSS can then be applied over the PSS layer, permitting layer-by-layer (LBL) deposition to make a multi-layer coating over the nanopillars. Furthermore, various charged particles as discussed above can be applied via LBL with a complementary ionic pairing partner to form coatings having the desired properties on the surface of the nanoparticles.

Master Mold Formation

In certain aspects, the present disclosure contemplates fabricating an authentication feature template master mold. Thus, a master mold may be formed by creating a master mold defining a nanostructured pattern or array comprising a plurality of axially shaped nanopillars in a predetermined pattern on a first substrate. The first substrate may be treated to form an oxidation layer or working layer. By way of non-limiting example, the first substrate may include a material selected from the group consisting of silicon (Si), polydimethylsiloxane (PDMS), glass, quartz, polyethylene terephthalate (PET), polycarbonate (PC), polyethylene (PE), polyurethene (PU), cyclic olefin copolymer (COC), and combinations thereof. For example, where the first substrate is silicon, the first substrate may be thermally oxidized to form a silicon dioxide layer having a predetermined thickness. In certain aspects, a thickness of the nanopillars formed through such a process may be controlled by an initial thickness of a starting oxide layer (or starting working layer) or by deposition processes, etching and the like. A photoresist may be applied to form a pattern (e.g., a plurality of dots). Then, the oxide layer or working layer is further etched, for example, by etching processes like inductively coupled plasma etching, by way of non-limiting example.

The axially shaped nanopillars may be further processed, for example, by etching or otherwise treating, to provide the desired dimensions for the nanopillars to be replicated. Thus, a size, shape, diameter, and height of the nanostructures can be further modified by certain processes to achieve the desired nanopillar dimensions.

Thus, a master mold may be initially produced on a substrate (e.g., silicon (Si) wafers) by standard photolithography followed by dry etching. One example of a method of forming such a master mold, forming a replication mold from the master mold, followed by nanostructuring of a surface is shown in FIGS. 3(a)-3(m) and 4(a)(1)-4(a)(4) and described as follows. First, silicon wafers are placed in a furnace (not shown, Furnace E1200, Centrotherm, Germany) for oxidation to form a layer of silicon dioxide (e.g., a 500 nm thick layer of $SiO_2$). FIG. 3(a). The thermally oxidized wafer is then spin-coated with photoresist dots at a thickness of about 0.7 μm photoresist, followed by patterning using a KrF scanner (not shown S203-B, Nikon, Japan) to form 500 nm sized dots in FIG. 3(b). Next, the Si wafer is further etched using inductively coupled plasma (ICP) (TCP9400SE, Lam Research, USA) gas mixtures of $Cl_2$, HBr, and $O_2$ to produce Si nanopillars, as shown in FIG. 3(c). The Si nanopillar arrays thus formed have cylindrical shapes with diameters of about 500 nm and heights of 740 nm (FIGS. 4(a)(1)-4(a)(4)).

A variety of dimensions of Si nanopillars can be obtained by controlling the oxidation time and etching conditions. For certain processes, about 46% of Si surface appears to be oxidized due to the stoichiometric ratios and the density difference of Si and $SiO_2$. In order to reduce the diameter of the pillars to increase the aspect ratio, thermal oxidation and etching steps (FIGS. 4(a)(1) and 5(a)-5(e)). Three different thermal oxidation conditions are applied to form $SiO_2$ layers of different thicknesses of 150 nm, 300 nm, and 500 nm (FIGS. 4(b)(1)-4(b)(3)). Oxygen penetration into Si results in increased nanopillar diameters and reduction of radius (r). However, the subsequent dry etching removes $SiO_2$ and reveals nanopillars with diameters as small as 50 nm, which are some of the smallest reported to date. Afterwards, the photoresist dots and $SiO_2$ are stripped, as shown in FIG. 3(d). See also, FIGS. 3(o)-3(p) that are SEM images of the original silicon nanopillar master mold thus formed.

Replication Mold Formation

The master mold is used to create negatives of master mold. The first replication mold will have an array of nanoholes is made in the following manner. A polymeric precursor material may be applied over and around the plurality of axially shaped nanopillars on the first substrate (to fill the void regions between the nanopillars) on the master mold. Next, a second substrate is disposed along an upper side of the polymeric precursor material and nanopillars. The second substrate may be any of the materials described above, including by way of non-limiting example, a material selected from the group consisting of plastics, including polyethylene terephthalate (PET) and cyclic olefin copolymer (COC), glass, paper, metal foil, fabric, meshes, and combinations thereof.

The polymeric precursor may then be partially or fully cured to form a replication mold defining a plurality of nanoholes (in the regions occupied by the nanopillars of the master mold). The second substrate and cured polymer formed by the polymeric precursor may be removed or released from the master mold, thus forming a replication mold comprising an array of nanoholes. In certain aspects, the replication mold may be further cured after separating the polymer and second substrate from the master mold. The replication mold may thus be used in the method described above to form an array of nanopillars on a surface of an article in need of an authentication feature.

In one variation, a curable polymeric precursor (such as PUNO) is used in a conventional spin-casting method. The curable precursor is poured and spin-coated onto the Si nanopillar array. FIG. 3(e). An upper substrate, such as PET film, is disposed on top of the array and polymer precursor. The upper substrate is then carefully rolled to remove air bubbles. FIG. 3(f). The curable precursor and upper substrate are then cured in FIG. 3(g), for example, by being exposed to UV light for 1 minute to cure the precursor (e.g., PUNO) as well as increase the adhesion to the upper substrate film. Subsequently, the upper substrate film (e.g., PUNO/PET) is peeled off from the Si master mold. FIG. 3(h). For the further curing of precursor (e.g., PUNO), the film is exposed to UV light for another 5 minutes. FIG. 3(i).

As noted above, the PUNO is a polymer blend that includes NOA63 (Norland Optic Adhesives) and polyurethane acrylate (PUA, MINS-311RM, Minuta Tech.) that is used to transfer the nanostructures from the molds. One particularly suitable blend has a ratio of 7:3 on a volume basis of PU:NOA63, which provides easy release from the mold and adhesion to target substrates. PU itself generally shows poor adhesion to certain substrate materials, like PET film, which makes it difficult or impossible to release from mold. In case of NOA, its highly adhesive property demonstrates high bonding capability between NOA63/PUNO. However, the blend of PUA/NOA63 provides an ability to produce nanostructures that are then released from the mold onto a target substrate surface.

Polymerization shrinkage commonly occurs during the UV curing process. At the same time, the UV-induced shrinkage occurs by about 1.3% (from SEM measurement) resulting in the detachment of the nanopillars from the walls of the mold (FIGS. 4(c)(1)-4(c)(2)). Hence, the adhesion of the polymer to the mold is drastically lowered and a large sheet of cured PUNO can be easily peeled off as a flexible patterned sheet. This is also possible because PUNO displays excellent mechanical properties with Young's Modulus (E)=24 MPa and ultimate tensile strength ($\sigma_{ult}$)=11.5 MPa (FIG. 6). In contrast, PDMS polymers typically show E less than 10 MPa and $\sigma_{ult}$ of less than 2.4 MPa. Due to the low strength, PDMS-based nanopillars break when being detached from the substrate. Addition of NOA63 also addresses the problem of low adhesion, in that it is exceptionally strong. As a demonstration of such adhesion, a PET/PUNO/PET composite film is stretched to failure which required $\epsilon$=321% of strain (FIGS. 7(a)(1)-7(a)(3)). By contrast, PDMS film is easily peeled from PET surface at the onset of the sample testing (FIGS. 7(b)(1)-7(b)(3)) with strains $\epsilon$<66%. From the stress-strain curve and the areas of PET-PUNO contact, the adhesion energy is calculated at a PUNO-PET interface of 10.3 MPa, which compares favorably to that of the 8.4 MPa of commercial superglue (DP8010, 3M). A fabric/PUNO/fabric system is shown in FIGS. 7(c)(1)-7(c)(4).

Due to the improved mechanical performance and the facilitated detachment process, the first replica from lithographically patterned substrates (FIG. 4(a)(3)) displays a highly uniform array of holes with nearly ideal fidelity over the entire surface (FIGS. 4(b)(7)-4(b)(9)). The similar cast-lift process can be carried out using this hole-array mold as a template.

Nanopillar Array Formation

Once a mold having the nanohole array in a desired pattern is formed, it can be used for replication to form nanopillar arrays that will serve as authentication features. See FIG. 3(i), for example. The replication and transfer steps are similar to the above processes for forming nanoholes in the mold. A polymeric precursor, such as an elastomeric precursor, can be used to fill the nanopillar cavities in the mold. FIG. 3(j). The newly deposited liquid polymeric precursor completely penetrates the nanoscale holes in the mold. For the fabrication of nanopillars on the target substrates to include an authentication features, a previously formed nanohole array is disposed on the upper substrate (e.g., PET film) and is thus used as a secondary mold. The polymeric precursor (e.g., PUNO) may be spin-coated to fill the nanoholes, for example, at 1500 rpm for 30 seconds. After coating with the polymeric precursor, the entrapped air bubbles are removed in a vacuum chamber. The target substrate surface (on which the authentication feature will be formed) is carefully placed over the precursor within the nanoholes. The substrate may be formed of materials like PET film, cyclic-olefin copolymers (COC), glass, paper, aluminum foil, fabric, and the like. The COC plate is fabricated using the microinjection mold method. PET film (commercially available from MITSUBISHI, Japan), clean paper (commercially available from NanoTech, Republic of Korea), slide glass (commercially available from Marinenfeld, Germany), fabric (Korea Manufacturer, Korea), and Al foil (commercially available from DAIHAN, Republic of Korea) are purchased and used without any further processing.

Subsequent rolling of substrate may be performed to remove air bubbles. FIG. 3(k). Then, the material and the precursor are exposed to curing conditions, such as UV light for 1 minute. FIG. 3(l). After release of the cured polymer (e.g., cured PUNO) and target substrate composite from the mold (FIG. 3(m)), the cured polymer nanopillar array may be further cured, for example, by placement under UV light for 5 minutes (not shown). Exposure to UV light results again in the detachment of the cured polymer from the walls of the wells and a replication of the original nanopillar array. FIG. 3(n) shows the nanopillar array as formed by such a process. Both original silicon nanopillar master mold and secondary nanohole mold are reusable.

To gain insight into the interfacial interactions between the PUNO and various substrates, Raman peak intensity changes (2928 $cm^{-1}$) and peak frequency shift (1617 $cm^{-1}$) are measured at the cross-section of PUNO/fabric interfaces (FIGS. 8(a)-8(d)) as an example. Raman scattering peaks at 2928 $cm^{-1}$ and 1617 $cm^{-1}$ attributed to the $v_{C-H}$ stretch of PUNO and $v_{C=C}$ stretch of the aromatic ring of polyester fabric, respectively, changed when in contact with the substrate (FIGS. 8(b)-8(d)). Furthermore, the strong Raman signal intensity changes from blue (pristine PUNO) to red (PUNO/fabrics) which represented hydrogen bonds ($v_{C-H}$) are also easily observed at the interface after polymerization of PUNO. The significant frequency shift which corresponds to $v_{C=C}$ stretch of the aromatic rings from both PUNO and polyester fabric indicated strong C=C bonds at the interface of PUNO/fabric (FIG. 8(c)). These observations indicated that hydrogen bonds ($v_{C-H}$) and other bonds associated with the easily polarizable C=C bonds are likely to be involved in bonding with PUNO and fabrics. Since these interactions are generic, they are transferable and applicable to nanopillar arrays on other substrates, as well (see FIGS. 9(a)-9(b)(4), showing glass, polymer film, fabric, and plastic substrates).

By way of demonstration, in FIG. 9(a), articles formed of various materials are used as non-limiting representative example materials, including glasses (designated No. 1), a polymer glove (designated No. 2), a T-shirt (designated No. 3), a plastic cup (designated No. 4). In FIGS. 10(a)(1)-10(a)(3), paper is used as a substrate, while FIGS. 10(b)(1)-10(b)(3), aluminum foil is used. These substrates are used to investigate whether successful bonding and replication of nanopillar arrays on the various substrates takes place without structural damage, evaluated by SEM images of both cross sections and surface as seen in FIGS. 9(b)(1)-9(b)(4) and 10(a)(2)-10(a)(3) and 10(b)-(2)-10(b)(3). It is difficult to distinguish the boundary between the PUNO and substrates including polymers, fabric, and glass due to great adhesive characteristics of PUNO on the surface. Notably the resulting nanopatterned films display rainbow colors and opalescence due to the optical bandgap effect. When materials are covered with PUNO nanopillar arrays, one can see the logos and materials colors through the thin film over the substrates, as shown in FIG. 9(a).

Nanopillar Surface Modification

As noted above, the surfaces of the nanopillars may be modified to have different characteristics than the initial nanopillar polymeric material. In this example, the surface characteristics of pristine polymeric nanopillars on the different substrates are converted into superhydrophilic surface coatings by using a 10 nm $SiO_2$ coating. During this process, multi target plasma sputtering (SRN-110, Sorona, Korea) is used. The samples are simply loaded into the chamber and $SiO_2$ is physically attached to the nanopillars.

In another example, a superhydrophilic surface is formed on the nanopillars through deposition of initiator chemical vapor deposition (iCVD) polymer. The polymer is poly(3,3,4,4,5,5,6,6,7,7,8,8,9,9,10,10,10-Heptadecafluorodecyl methacrylate) (pHDFDMA) Notably, 3,3,4,4,5,5,6,6,7,7,8,8,9,9,10,10,10-heptadecafluorodecyl methacrylate (HD-FDMA, 97%), tert-butyl peroxide (TBPO, 98%), poly(diallyldimethylammonium) chloride (PDDA, 20 wt. % in water) and poly(sodium 4-styrenesulfonate) (PSS, MW 70,000) are purchased from Sigma-Aldrich and used without further purification for iCVD.

A layer of pHDFDMA is coated on the surface of fabricated polymeric nanopillars using a customized iCVD reactor (Daeki Hi-Tech Co., Ltd). TBPO is used as an initiator in the polymerization of HDFDMA. The vaporized monomer and the initiator, each with a flow rate of 1 sccm, are administered into the iCVD chamber. In order to obtain the target flow rate, TBPO is kept at room temperature (RT), and HDFDMA is heated to 80° C. before application into the iCVD reactor. The pressure inside the chamber is set at 80 mTorr. The temperature of the filament is maintained at 210° C., while the substrate temperature is set at 37° C. The initiator molecules are activated through contact with the heated filament, to create radicals. The radicals transform the monomer molecules into monomer radicals, which then induces the chain reaction. The radical polymerization reaction continues to take place on the surface of the substrate until the reaction is stopped by turning off the filament and halting the flow of monomer and initiator. The thickness of the coated polymer layer is assessed in situ by He—Ne laser (JDS Uniphase). A scanning electron microscope (SEM, Sirion, FEI), a transmission electron microscope (TEM, JEM 2100-F, 200 kV, Jeol), and energy dispersive X-ray spectroscopy (EDAX) are employed for further analysis of nanostructures and their components. The roughness changes of nanopillars after $SiO_2$ coating are investigated using an atomic force microscope (AFM, XE-100, Park Systems, Korea).

In yet another variation, a process of inkjet LBL deposition is used to modify the surface properties of the nanopillars. High molecular weight PDDA and PSS are diluted to 0.0025 wt. % in deionized water as the positive and negative polyelectrolytes, respectively. The patterns are printed using FUJIFILM-Dimatix inkjet printer and alternating cartridges (10 pL drop volume) containing the solutions of PDDA and PSS. Jetting conditions are optimized by adjusting the drive voltage-time waveform for the piezoelectric print-head to produce stable drops. 4 bilayers of ink are printed and dried at 35° C. in between prints for 2 minutes on the printer platen, followed by drying on a hotplate for 1 hour after the printing steps.

The mechanical properties of the PUNO also come into play when nanopillar arrays from this material are subjected to shear. Notably nanopillar arrays from other materials—PDMS, Si, $SiO_2$ and ZnO are often easily rubbed off from a substrate. To investigate the rubbing resistance of nanopillar arrays from PUNO, the superhydrophobic form of the nanopillars is used for evaluation. The high contact angle (CA) with water is convenient for testing of shear resilience on the substrates. The superhydrophobic nanopillar arrays produced by surface modification with poly(3,3,4,4,5,5,6,6,7,7,8,8,9,9,10,10,10-heptadecafluorodecyl methacrylate) in an initiated chemical vapor deposition (iCVD) method (FIGS. 10(*a*)(1)-10(*a*)(3) and 11(*a*)(1)-11(*a*)(2)). A rubbing test may be conducted by fixing the nanopillar array on a plastic substrate and rubbing with different types of materials including brush, fabric, and polymeric tips more than 500 times. The measured contact angles (CA) and average values are used for the plots.

Alternatively, the superhydrophilic surfaces can be produced by sputtering of $SiO_2$ (about 5 nm thickness) (FIGS. 11(*b*)(1)(*i*)-11(*b*)(3)(*vi*), 12(*a*)-12(*d*), and 13(*a*)-13(*f*)). The overall CA changes with different nanopillar morphology and surface modification is observed and displayed in FIG. 14(*a*). FIG. 14(*a*) shows overall CA changes corresponding to the different nanopillar structures and superhydrophobic (top green region) and superhydrophilic (bottom yellow region) coating. The superhydrophobic nanopillar array film is rubbed (FIG. 14(*b*)) with different materials such as cloth, brush, and finger more than 500 times under pressure of 4.9 KPa (FIG. 14(*c*) and FIGS. 15(*a*)-15(*b*)). FIG. 14(*b*) shows an SEM image of a pristine nanopillar array (NPA) (before rubbing), while FIG. 14(*c*) shows the NPA after rubbing by finger. Scale bars are 5 μm and 500 nm for inserted image. FIGS. 15(*a*)-15(*b*) show different magnifications of SEM images for NPAs after rubbing with finger. FIG. 14(*d*) shows CA change over repeated mechanical rubbing using different materials. The initial CA is 159°±0.39 and gradually decreased down to 138°±5.9 (FIG. 14(*d*)). The pillars are bent along to the force direction, but the overall structures remain over the substrate. Furthermore, the ability to repel water droplets is retained. In comparison, conventional reported superhydrophobic films became hydrophilic with CA=45°±8 within 5 rubs with the same pressure.

The nanopillar arrays are also treated with the layer-by-layer assembly (LBL) method discussed above, by depositing multiple conformal hydrophilic layers on top of the hydrophobic nanopillars using inkjet LBL modality. FIGS. 16(*a*)-16(*e*) show hidden and overt images printed on nanopillar arrays using such inkjet LBL deposition. A photograph of the nanopillar array with hidden image before (FIG. 16(*a*)) and after ((FIG. 16(*b*)) breath is applied to the surface. FIG. 16(*c*) is an SEM image of the edge of the image demonstrating the difference between pristine and LBL coated nanopillars. A photograph of a logotype ink-jet printed on the PUNO nanopillar array is shown in FIG. 16(*d*). FIG. 16(*e*) is an SEM of the nanopillars from FIG. 16(*d*) at the edge of the letters formed, demonstrating the difference between pristine and LBL coated nanopillar area.

This finding opens the way to highly customizable images on a variety of substrates. Nanometer-scale thick LBL coating does not change the appearance of the nanopillars or their periodicity and therefore it remains virtually invisible (FIG. 16(*a*)). However, it strongly changes local CA, which enables creation of inkjet printable hidden images. They are only revealed under exposure to change in relative humidity, for instance by human breath (FIG. 16(*b*)). As the LBL layer becomes thicker and the space between the nanopillars becomes filled, highly visible images can be printed as well (as shown in FIGS. 16(*d*)-16(*e*)). The combination of overt and covert information is particularly useful for anti-counterfeit tags and features. The human breath visualization is a simple method of authentication applicable to most products being counterfeited.

In this example, how the contact angle between the droplets forming the image change over time is investigated. Three samples with different contact angles are tested over a period of few hours to ascertain changes over time. A first sample has a nanopillar array formed of a superhydrophobic material without any treatment like dip-coating via layer-by-layer (LBL). A second sample and a third sample are formed on the same sheet, where the nanopillar arrays are dip-coated via LBL on the hydrophobic nanopillar arrays to form a gradient of hydrophilicity.

A water droplet (with a volume of about 20 μL) is applied to a surface of the first sample having the superhydrophobic nanopillar array without any treatment. The contact angles over time for a first sample are observed. FIG. 17(*a*) shows an initial contact angle of about 150°. FIG. 17(*b*) shows a contact angle after about 2.5 hours where the contact angle is about 21°, showing a significant decrease in hydrophobicity over time.

A 20 μL volume water droplet is applied to the surface of the second sample having the superhydrophobic nanopillar array that has been dip-coated via a layer-by-layer technique to form a hydrophobic gradient. FIG. 18(*a*) shows an initial contact angle of about 140°. FIG. 18(*b*) shows a contact angle after about 2.5 hours where the contact angle is about 101°, so that the hydrophobic properties are substantially retained, as compared to the first sample.

FIG. 19 shows a contact angle for a water droplet (with a volume of about 10 μL) for a third sample of a superhydrophobic nanopillar array on a sheet that has been dip-coated via a layer-by-layer technique to form a hydrophobic gradient. FIG. 19 shows an initial contact angle of about 100°. After 2.5 hrs, the contact angles totally disappeared. The amount of liquid used in this sample is 10 μL, less than the first two samples (20 μL). If 20 μL of water is used, the shape of droplet changes greatly to be a sphere. Where the water droplet is not a sphere, the boundary between solid/liquid can be hard to discern.

In other example, a plurality of bridge structures is formed respectively between select nanopillars of the array of nanopillars. FIGS. 20 and 21 show a nanopillar array comprising a plurality of nanopillars that include a plurality of bridge structures formed between respective nanopillars on a surface of an article in accordance with certain the principles of the present disclosure. As can be seen, in certain variations, a first nanopillar may be connected to a second nanopillar via a single bridge structure, thus having a single point of connection with an adjacent or nearby nanopillar. In other variations, a first nanopillar may be connected to both a second nanopillar via a first bridge structure and to a third nanopillar via a second bridge structure. In yet other variations, a first nanopillar may be connected to a second nanopillar via a first bridge structure, a third nanopillar via a second bridge structure, and a fourth nanopillar via a third bridge structure. The first and second or third bridge structures may be oriented at 90° angles to one another or may be oriented at 180° to one another. In such a variation, the bridge structures may be formed after the nanopillars are formed. Where the bridge structures are present, the nanopillar array pattern may be visible to a human eye and without need for application of vapor or condensate.

In conclusion, new methods of nanopillar array production provided by the present disclosure are scalable and universally adhesive on various substrates. Such methods may use certain curable polymer matrix materials that balance adhesion and mechanical strength, such as a special polyurethane blend that enables single-step replication of nanopillar arrays with high fidelity. Moreover, the technique affords the transfer of nanopillar arrays onto a variety of substrates, including fabric, paper, and metals via intermolecular bonds. Tunable contact angles (CA) of the nanopillar array can be achieved by additional chemical modification. The nanopillar array structures are maintained, including flexibility and wettability, even after rubbing with various materials including finger, brush, and fabrics. Such nanopillar arrays also can be used as suitable structures for inkjet nanopatterning and replication systems using the ability of LBL films to form thin conformal coatings. Furthermore, by locally altering the CA on the nanopillar array, transparent LBL films can be used to create overt and covert images, which can be simply revealed by human breath. These techniques of nanostructure transferable and LBL can be useful as platforms for potential cost-effective wearable electronics, biosensing, energy storage system, and anti-counterfeit industry.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An article having an authentication feature comprising:
    a surface of the article; and
    an array of exposed nanopillars comprising a polymeric material disposed on one or more regions of the surface defining a predetermined pattern, where the polymeric material is selected from the group consisting of: a polyurethane acrylate polymer, a urethane-based mercapto ester polymer, and combinations thereof and has:
       (i) a Young's modulus of greater than or equal to about 10 MPa, and
       (ii) an ultimate tensile strength ($\sigma_{ult}$) of greater than or equal to about 2.4 MPa,
    wherein the predetermined pattern of the array of nanopillars defines the authentication feature,
    wherein the authentication feature is only visible to detection by a human eye when moisture or condensate forms on the array of exposed nanopillars.

2. The article of claim 1, wherein each nanopillar of the array has an average height of greater than or equal to about 500 nm to less than or equal to about 5 µm.

3. The article of claim 1, wherein each nanopillar of the array has an average diameter of greater than or equal to about 50 nm to less than or equal to about 600 nm.

4. The article of claim 1, wherein the polymeric material comprises polyurethane acrylate and a urethane-based mercapto ester polymer.

5. The article of claim 4, wherein the polymeric material comprises polyurethane acrylate at greater than or equal to about 60% to less than or equal to about 80% by volume of the total polymeric material and the urethane-based mercapto ester polymer at greater than or equal to about 20% to less than or equal to about 40% by volume of the total polymeric material.

6. The article of claim 1, wherein the array of exposed nanopillars comprises at least one nanopillar having a surface that is coated or treated.

7. The article of claim 6, wherein the surface of the at least one nanopillar that is coated or treated has a property selected from the group consisting of: hydrophobic, superhydrophobic, hydrophilic, superhydrophilic, olephobic/lipophobic, olephilic/lipophilic, omniphilic, omniphobic, positively-charged (cationic), negatively-charged (anionic), polyethylene glycol (PEG)-ylated, coated with a zwitterion, nano structured, optical properties, special absorption colors, luminescent colors, up conversion, infrared radiation (IR) emission, radioactivity, magnetic codes or patterns, and combinations thereof.

8. The article of claim 6, wherein the surface of the at least one nanopillar has a surface coating comprising a nanoparticle selected from the group consisting of: semiconductor nanoparticles, magnetic nanoparticles, metallic nanoparticles, plasmonic nanoparticles, chiral nanoparticles, catalytic nanoparticles, chemically reactive nanoparticles, oxide nanoparticles, luminescent nanoparticles, infrared radiation (IR) or other radiation absorbing nanoparticles, spiky nanoparticles, scattering nanoparticles, supraparticles, polymeric nanoparticles, swellable nanoparticles, and combinations thereof.

9. The article of claim 1, wherein the surface of the article is a material selected from the group consisting of: textiles, fibers, leather, polymers, metals, ceramic, glass, wood, cardboard, paper, and combinations thereof.

10. The article of claim 1, wherein the authentication feature is iridescent when moisture or condensate forms on the array of exposed nanopillars.

11. The article of claim 1, wherein at least one bridge structure connects a first nanopillar to a second nanopillar in the array of exposed nanopillars.

12. A method of making an article having an authentication feature, the method comprising:
    applying a polymeric precursor to a mold comprising an array of nanoholes, so that the polymeric precursor fills the nanoholes;

disposing a surface of the article against the mold in contact with the polymeric precursor;

at least partially curing the polymeric precursor to form a polymeric material either before the disposing or after the disposing, wherein the polymeric material is selected from the group consisting of: a polyurethane acrylate polymer, a urethane-based mercapto ester polymer, and combinations thereof and has:
(i) a Young's modulus of greater than or equal to about 10 MPa, and
(ii) an ultimate tensile strength ($\sigma$ult) of greater than or equal to about 2.4 MPa; and removing the article from the mold so that the surface comprises an array of exposed nanopillars disposed thereon that define the authentication feature, wherein the authentication feature is only visible to detection by a human eye when moisture or condensate forms on the array of exposed nanopillars.

13. The method of claim 12, wherein the applying is selected from the group consisting of: spin-casting or spin-coating, jetting, spraying, gravure application, and combinations thereof.

14. The method of claim 12, wherein the at least partially curing the polymeric precursor occurs after the disposing of the surface of the article against the mold and comprises fully curing the polymeric precursor to form the polymeric material.

15. The method of claim 12, further comprising treating or coating at least a portion of the nanopillars of the array.

16. The method of claim 12, wherein after the removing, the method further comprises spraying or jetting a first charged material having a first polarity onto at least one nanopillar of the array, spraying or jetting a second charged material having a second polarity opposite to the first polarity over the first charged material in a layer-by-layer process, wherein the first charged material and the second charged material are distinct from one another, so as to form a surface coating on the at least one nanopillar.

17. An article having an authentication feature comprising:
a surface of the article; and
an array of exposed nanopillars comprising a polymeric material disposed on one or more regions of the surface defining a predetermined pattern, where the polymeric material is selected from the group consisting of: polyurethane acrylate, a urethane-based mercapto ester polymer, and combinations thereof, wherein the nanopillars are substantially free of physical defects and the predetermined pattern of the array of exposed nanopillars defines the authentication feature,
wherein the authentication feature is only visible to detection by a human eye when moisture or condensate forms on the array of exposed nanopillars.

18. A method of authenticating an article having an authentication feature, the method comprising:
applying moisture or vapor to a region of a surface of the article having an array of exposed polymeric nanopillars that is substantially invisible to a human eye in the absence of condensate, wherein the polymeric material is selected from the group consisting of: a polyurethane acrylate polymer, a urethane-based mercapto ester polymer, and combinations thereof and has:
(i) a Young's modulus of greater than or equal to about 10 MPa, and
(ii) an ultimate tensile strength ($\sigma$ult) of greater than or equal to about 2.4 MPa,
wherein the moisture or vapor applied condenses on the region of the surface to reveal a graphic image that is observable by the human eye to authenticate the article.

* * * * *

UNITED STATES PATENT AND TRADEMARK OFFICE
CERTIFICATE OF CORRECTION

| | |
|---|---|
| PATENT NO. | : 9,694,518 B2 |
| APPLICATION NO. | : 14/746257 |
| DATED | : July 4, 2017 |
| INVENTOR(S) | : Nicolas A. Kotov et al. |

It is certified that error appears in the above-identified patent and that said Letters Patent is hereby corrected as shown below:

In the Claims

Column 26, Claim 7, Line 38, delete "nano structured," and insert --nanostructured,-- therefor Column 27, Claim 12, Line 11, delete "(σult)" and insert --($\sigma_{ult}$)-- therefor Column 28, Claim 18, Line 30, delete "(σult)" and insert --($\sigma_{ult}$)-- therefor Signed and Sealed this
Second Day of January, 2018

Joseph Matal
*Performing the Functions and Duties of the*
*Under Secretary of Commerce for Intellectual Property and*
*Director of the United States Patent and Trademark Office*